US011293320B2

(12) United States Patent
Sato et al.

(10) Patent No.: US 11,293,320 B2
(45) Date of Patent: Apr. 5, 2022

(54) CONTROL DEVICE, EXHAUST GAS PURIFICATION SYSTEM, AND CONTROL METHOD OF ENGINE

(71) Applicant: MITSUBISHI HEAVY INDUSTRIES ENGINE & TURBOCHARGER, LTD., Sagamihara (JP)

(72) Inventors: Daisuke Sato, Sagamihara (JP); Mizuki Kanai, Sagamihara (JP); Kazuki Nishizawa, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/274,234

(22) PCT Filed: Aug. 28, 2019

(86) PCT No.: PCT/JP2019/033761
§ 371 (c)(1),
(2) Date: Mar. 8, 2021

(87) PCT Pub. No.: WO2020/054428
PCT Pub. Date: Mar. 19, 2020

(65) Prior Publication Data
US 2021/0310390 A1    Oct. 7, 2021

(30) Foreign Application Priority Data

Sep. 10, 2018  (JP) .............................. JP2018-168466

(51) Int. Cl.
| | |
|---|---|
| *F01N 3/00* | (2006.01) |
| *F01N 3/023* | (2006.01) |
| *F01N 3/10* | (2006.01) |
| *F01N 3/20* | (2006.01) |

(Continued)

(52) U.S. Cl.
CPC ........... *F01N 3/0235* (2013.01); *F01N 3/103* (2013.01); *F01N 3/20* (2013.01); *F01N 9/002* (2013.01);
(Continued)

(58) Field of Classification Search
CPC .......... F01N 3/0235; F01N 3/20; F01N 9/002; F01N 3/103; F01N 2900/08; F01N 2900/0411; F01N 2900/1404; F02D 9/04
See application file for complete search history.

(56) References Cited

U.S. PATENT DOCUMENTS 5,067,973 A * 11/1991 Pattas ................. F02D 41/1446
95/12
2003/0110761 A1* 6/2003 Minami ................ F01N 3/0231
60/280
(Continued)

FOREIGN PATENT DOCUMENTS

EP      1 627 998 A1    2/2006
EP      1627998 A1 *    2/2006 ........... F02D 41/401
(Continued)

OTHER PUBLICATIONS

International Preliminary Report on Patentability and Written Opinion of the International Searching Authority for International Application No. PCT/JP2019/033761, dated Mar. 25, 2021, with an English translation.
(Continued)

*Primary Examiner* — Matthew T Largi
(74) *Attorney, Agent, or Firm* — Birch, Stewart, Kolasch & Birch, LLP

(57) ABSTRACT

Provided is a control device configured to be able to execute a forced regeneration process in an engine which includes a DOC and DPF disposed in an exhaust passage of the engine, and a temperature increase unit including an exhaust throttle
(Continued)

valve, for increasing a temperature of each of the DOC and the DPF. The forced regeneration process includes a first temperature increase process of controlling the temperature increase unit such that the temperature of the DOC is increased to a first temperature, and a second temperature increase process of controlling the temperature increase unit such that the temperature of the DPF is increased to a second temperature which is higher than the first temperature after completion of the first temperature increase process. The control device includes a valve opening/closing operation execution part configured to cause the exhaust throttle valve to execute a valve opening/closing operation of increasing an opening degree of the exhaust throttle valve to be greater than a predetermined opening degree for a predetermined time, when the forced regeneration process is switched from the first temperature increase process to the second temperature increase process.

11 Claims, 12 Drawing Sheets

(51) Int. Cl.
*F01N 9/00* (2006.01)
*F02D 9/04* (2006.01)

(52) U.S. Cl.
CPC ........ *F02D 9/04* (2013.01); *F01N 2900/0411* (2013.01); *F01N 2900/08* (2013.01); *F01N 2900/1404* (2013.01)

(56) References Cited

U.S. PATENT DOCUMENTS

| | | | | |
|---|---|---|---|---|
| 2004/0194450 | A1* | 10/2004 | Tanaka | F01N 9/002 60/285 |
| 2004/0231323 | A1* | 11/2004 | Fujita | F01N 3/0885 60/284 |
| 2005/0044845 | A1 | 3/2005 | Onodera | |
| 2005/0050881 | A1* | 3/2005 | Toshioka | F01N 3/0253 60/285 |
| 2005/0217251 | A1* | 10/2005 | Sato | F02D 41/029 60/295 |
| 2006/0201144 | A1 | 9/2006 | Gabe et al. | |
| 2009/0044517 | A1* | 2/2009 | Oba | F01N 3/106 60/285 |
| 2020/0271046 | A1* | 8/2020 | Kelly | F01N 3/021 |

FOREIGN PATENT DOCUMENTS

| | | | |
|---|---|---|---|
| JP | 2300-179326 | A | 6/2000 |
| JP | 2003-206724 | A | 7/2003 |
| JP | 2004-293396 | A | 10/2004 |
| JP | 2004-353529 | A | 12/2004 |
| JP | 2005-76604 | A | 3/2005 |
| JP | 2006-29301 | A | 2/2006 |
| JP | 2006029301 | A * | 2/2006 |
| JP | 2008-82292 | A | 4/2008 |
| JP | 2308-138537 | A | 6/2008 |
| JP | 2014-238057 | A | 12/2014 |
| JP | 2015-190395 | A | 11/2015 |
| JP | 2018-44471 | A | 3/2018 |

OTHER PUBLICATIONS

International Search Report for international Application No. PCT/JP2019/033761, dated Nov. 19, 2019.
Extended European Search Report dated May 19, 2021 issued to the corresponding European Application No. 19860266.6.

* cited by examiner

CONTROL DEVICE, EXHAUST GAS PURIFICATION SYSTEM, AND CONTROL METHOD OF ENGINE

TECHNICAL FIELD

The present disclosure relates to a control device, an exhaust gas purification system including the control device, and a control method of an engine for executing, in the engine including a DOC and a DPF in an exhaust passage, a forced regeneration process of removing PM deposited on the DPF by increasing a temperature of the DPF.

BACKGROUND

An engine (diesel engine) may be equipped with an exhaust gas purification device which includes a diesel oxidation catalyst (DOC) disposed in an exhaust passage of the engine and a diesel particulate filter (DPF) disposed downstream of the DOC in the exhaust passage to collect particulate matters (PM), such as soot, contained in an exhaust gas (see Patent Document 1, 2).

If the PM collected by the DPF is deposited and clogs the DPF, PM-collecting performance may be declined, or an exhaust pressure (a pressure of the exhaust passage) may be increased, deteriorating fuel efficiency. Thus, the forced regeneration process of removing the PM deposited on the DPF is executed every time a PM deposition amount reaches a predetermined amount, or an engine operation time elapses a certain period of time.

Forced regeneration (automatic regeneration) of the DPF is executed by forcibly increasing an inlet temperature of the DPF. In general, the inlet temperature of the DPF is forcibly increased by supplying a non-combusted fuel to an exhaust gas treatment device by late-post injection, which is to inject a fuel after a main-combustion injection timing, and oxidizing the non-combusted fuel with the diesel oxidization catalyst (DOC) to generate heat, after the inlet temperature of the DOC is increased to a predetermined temperature (about 250° C.) at which the DOC is active.

In order to increase the inlet temperature of the DOC to the above-described predetermined temperature, reducing (decreasing) the opening degree of an intake throttle valve disposed in an intake passage of the engine, or adjusting an injection amount or an injection timing of the non-combusted fuel in early-post injection executed after the main-combustion injection timing and before the late-post injection timing are performed widely. It is possible to increase the inlet temperature of the DOC to the above-described predetermined temperature by reducing the opening degree of the exhaust throttle valve disposed in the exhaust passage of the engine. However, this method has not conventionally been adopted very much.

CITATION LIST

Patent Literature

Patent Document 1: JP2003-206724A
Patent Document 2: JP2004-353529A

SUMMARY

Technical Problem

The following problems can be given as a reason why the temperature increase method of reducing the opening degree of the exhaust throttle valve has not been adopted. Since the intake throttle valve is disposed in the intake passage for sending air (combustion gas) to the engine, a usage environment thereof is stable. By contrast, since the exhaust throttle valve is disposed in the exhaust passage for flowing the exhaust gas discharged from the engine, a usage environment thereof is unstable. More specifically, an operation failure and a decrease in responsiveness, which are caused by fixation of the exhaust throttle valve due to, for example, non-combusted fuel (HC) and particulate matters (PM) contained in the exhaust gas discharged from the engine, become problems, respectively. For example, if an actual opening degree of the exhaust throttle valve is less than an instructed opening degree instructed by the control device due to the operation failure by the fixation, the exhaust throttle valve is narrowed more than expected, which may decrease the amount of air supplied to the engine and the amount of the exhaust gas discharged from the engine, may increase the temperature and the pressure of the exhaust gas flowing through the exhaust passage. Moreover, since the exhaust throttle valve is narrowed more than expected, the temperature and the pressure of the exhaust gas flowing through the exhaust passage may also be increased by abnormal combustion of a residual fuel remaining in the combustion chamber. Then, if the temperature of the exhaust gas flowing through the exhaust passage is increased more than expected, a failure in engine and thermal deterioration of the oxidation catalyst of the DOC may be caused.

In view of the above issues, an object of at least one embodiment of the present invention is to provide a control device capable of preventing abnormal increases in temperature and pressure of the exhaust gas in the exhaust passage of the engine, during control of reducing the opening degree of the exhaust throttle valve.

Solution to Problem (1) A control device according to at least one embodiment of the present invention is a control device configured to be able to execute, in an engine which includes a DOC disposed in an exhaust passage of the above-described engine, a DPF disposed downstream of the above-described DOC in the above-described exhaust passage, and a temperature increase unit for increasing a temperature of each of the above-described DOC and the above-described DPF, a forced regeneration process of removing PM deposited on the above-described DPF by increasing the temperature of the above-described DPF. The above-described forced regeneration process includes a first temperature increase process of controlling the above-described temperature increase unit such that the temperature of the above-described DOC is increased to a first temperature, and a second temperature increase process of controlling the above-described temperature increase unit such that the temperature of the above-described DPF is increased to a second temperature which is higher than the above-described first temperature after completion of the above-described first temperature increase process. The above-described temperature increase unit includes an exhaust throttle valve disposed in the above-described exhaust passage. The above-described control device includes a valve opening/closing operation execution part configured to cause the above-described exhaust throttle valve to execute a valve opening/closing operation of increasing an opening degree of the above-described exhaust throttle valve to be greater than a predetermined opening degree for a predetermined time, when the above-described forced regeneration process is switched from the above-described first temperature increase process to the above-described second temperature increase process.

With the above configuration (1), the control device causes the exhaust throttle valve to execute the valve opening/closing operation of increasing the opening degree of the exhaust throttle valve to be greater than the predetermined opening degree for the predetermined time, when the forced regeneration process is switched from the first temperature increase process to the second temperature increase process. Executing the above-described valve opening/closing operation, the exhaust throttle valve can flow a non-combusted fuel and the PM deposited on the exhaust throttle valve downstream of the exhaust throttle valve in the exhaust passage. Reducing the non-combusted fuel and the PM deposited on the exhaust throttle valve, it is possible to prevent an operation failure caused by fixation of the exhaust throttle valve during the second temperature increase process. That is, it is possible to prevent an actual opening degree of the exhaust throttle valve from being less than an instructed opening degree instructed by the control device. Thus, since the actual opening degree of the exhaust throttle valve is equal to the instructed opening degree instructed by the control device, it is possible to set an appropriate flow rate of the exhaust gas flowing downstream of the exhaust throttle valve in the exhaust passage during the second temperature increase process. Thus, with the above configuration, it is possible to prevent abnormal increases in temperature and pressure of the exhaust gas in the exhaust passage of the engine, and to prevent a failure in the engine and thermal deterioration of an oxidation catalyst of the DOC, during control of reducing the opening degree of the exhaust throttle valve.

(2) In some embodiments, in the control device according to the above configuration (1), the above-described valve opening/closing operation execution part is configured to instruct the above-described exhaust throttle valve such that at least one of a speed at which the above-described exhaust throttle valve is opened or a speed at which the above-described exhaust throttle valve is closed in execution of the above-described valve opening/closing operation is not greater than a predetermined speed.

The amount of the exhaust gas flowing downstream of the exhaust throttle valve in the exhaust passage is rapidly increased/decreased, if the speed at which the exhaust throttle valve is opened and the speed at which the exhaust throttle valve is closed in execution of the valve opening/closing operation exceed the predetermined speed, increasing a possibility of occurrence of air flow noise (noise). With the above configuration (2), since at least one of the speed at which the exhaust throttle valve is opened or the speed at which the exhaust throttle valve is closed in execution of the valve opening/closing operation is not greater than the predetermined speed, it is possible to suppress occurrence of the air flow noise.

(3) In some embodiments, in the control device according to the above configuration (1) or (2), the above-described valve opening/closing operation execution part is configured to instruct the above-described exhaust throttle valve on an opening degree, which is less than a fully open opening degree, as an opening degree of the above-described exhaust throttle valve in execution of the above-described valve opening/closing operation.

If the opening degree of the exhaust throttle valve in execution of the valve opening/closing operation is fully open, the amount of the exhaust gas flowing downstream of the exhaust throttle valve in the exhaust passage is rapidly touched, which may result in the exhaust gas which is not purified by an exhaust gas purification device being discharged to the atmosphere. With the above configuration (3), since the opening degree of the exhaust throttle valve in execution of the valve opening/closing operation is less than the fully open opening degree, it is possible to suppress discharge of the exhaust gas, which is not purified by the exhaust gas purification device, to the atmosphere.

(4) In some embodiments, in the control device according to any one of the above configurations (1) to (3), the above-described valve opening/closing operation execution part is configured to cause the above-described exhaust throttle valve to execute the above-described valve opening/closing operation before late-post injection in the above-described second temperature increase process.

During execution of the late-post injection, the non-combusted fuel passes through the exhaust throttle valve having the decreased opening degree, which is likely to cause the operation failure due to fixation of the exhaust throttle valve. With the above configuration (4), executing the above-described valve opening/closing operation before the late-post injection in the second temperature increase process to reduce the non-combusted fuel and the PM deposited on the exhaust throttle valve, it is possible to prevent the operation failure caused by fixation of the exhaust throttle valve during the late-post injection.

(5) In some embodiments, the control device according to any one of the above configurations (1) to (4) further includes a feedforward opening degree acquisition part configured to be able to acquire a feedforward opening degree, which is the opening degree of the above-described exhaust throttle valve, based on information regarding an operational condition of the above-described engine, a feedback opening degree acquisition part configured to be able to acquire a feedback opening degree, which is the opening degree of the above-described exhaust throttle valve, based on a difference between a preset target temperature and a detected temperature acquired by an exhaust gas temperature detection device capable of detecting a temperature of an exhaust gas flowing through the above-described exhaust passage, and an instructed opening degree decision part configured to decide greater of the above-described feedforward opening degree, which is acquired by the above-described feedforward opening degree acquisition part, and the above-described feedback opening degree, which is acquired by the above-described feedback opening degree acquisition part, as an instructed opening degree to be instructed for the above-described exhaust throttle valve.

With the above configuration, since the greater of the above-described feedforward opening degree and the above-described feedback opening degree as the instructed opening degree of the exhaust throttle valve, it is possible to prevent a lack of the amount of air supplied to the engine and the amount of an exhaust gas discharged from the engine, and to suppress the high temperature of the exhaust gas flowing through the exhaust passage exceeding the target temperature. Thus, with the above configuration, it is possible to prevent the abnormal increases in temperature and pressure of the exhaust gas in the exhaust passage of the engine, and to prevent the failure in the engine and the thermal deterioration of the oxidation catalyst of the DOC, during control of reducing the opening degree of the exhaust throttle valve.

(6) In some embodiments, the control device according to the above configuration (5) further includes a control gain adjustment part configured to be able to adjust a control gain when the above-described feedback opening degree is calculated. The above-described control gain adjustment part is configured to adjust the above-described control gain such that the above-described recalculated feedback opening degree is greater than the above-described feedforward opening degree, if the above-described detected temperature exceeds the above-described target temperature, and the above-described feedback opening degree is not greater than the above-described feedforward opening degree.

With the above configuration (6), if the detected temperature exceeds the target temperature, the feedback opening degree is decided as the instructed opening degree of the exhaust throttle valve. At this time, if the feedback opening degree is not greater than the feedforward opening degree, the control gain adjustment part adjusts the control gain such that the recalculated feedback opening degree is greater than the feedforward opening degree. With the above configuration, if the detected temperature exceeds the target temperature, the opening degree is controlled with the recalculated feedback opening degree being decided as the instructed opening degree of the exhaust throttle valve. Thus, control of increasing the opening degree of the exhaust throttle valve, and decreasing the temperature and pressure of the exhaust gas flowing through the exhaust passage is performed quickly such that the detected temperature approaches the target temperature, making it possible to shorten a period in which the exhaust gas flowing through the exhaust passage has the high temperature exceeding the target temperature.

(7) In some embodiments, the control device according to the above configuration (5) or (6) further includes a control gain adjustment part configured to be able to adjust a control gain when the above-described feedback opening degree is calculated. The above-described control gain adjustment part is configured to adjust the above-described control gain such that the above-described recalculated feedback opening degree is less than the above-described feedforward opening degree, if the above-described detected temperature is not higher than the above-described target temperature, and the above-described feedforward opening degree is not greater than the above-described feedback opening degree.

With the above configuration (7), if the detected temperature is not higher than the target temperature, the feedforward opening degree is decided as the instructed opening degree of the exhaust throttle valve. At this time, if the feedforward opening degree is not greater than the feedback opening degree, the control gain adjustment part adjusts the control gain such that the recalculated feedback opening degree is less than the feedforward opening degree. With the above configuration, if the detected temperature is not higher than the target temperature, the opening degree is controlled with the feedforward opening degree being decided as the instructed opening degree of the exhaust throttle valve. Thus, since the opening degree of the exhaust throttle valve is controlled based on the information regarding the operational condition of the engine, it is possible to prevent the lack of the amount of the air supplied to the engine and the amount of the exhaust gas discharged from the engine.

(8) In some embodiments, in the control device according to the above configurations (5) to (7), the above-described information regarding the operational condition of the engine includes a rotation speed of the above-described engine and a fuel injection amount.

With the above configuration (8), since the information regarding the operational condition of the engine includes the engine rotation speed and the fuel injection amount, the feedforward opening degree acquisition part can acquire an appropriate feedforward opening degree on which the engine rotation speed and the fuel injection amount are reflected.

(9) An exhaust gas purification system according to at least one embodiment of the present invention includes the control device according to any one of the above configurations (1) to (8), the above-described DOC, the above-described DPF, and the above-described temperature increase unit including the above-described exhaust throttle valve.

With the above configuration (9), since the control device causes the exhaust throttle valve to execute the valve opening/closing operation when the forced regeneration process is switched from the first temperature increase process to the second temperature increase process, the exhaust gas purification system can prevent the operation failure caused by fixation of the exhaust throttle valve during the second temperature increase process.

(10) A control method of an engine according to at least one embodiment of the present invention is a control method of an engine, which includes a DOC disposed in an exhaust passage of the above-described engine, a DPF disposed downstream of the above-described DOC in the above-described exhaust passage, and a temperature increase unit for increasing a temperature of each of the above-described DOC and the above-described DPF, for executing a forced regeneration process of removing PM deposited on the above-described DPF by increasing the temperature of the above-described DPF. The above-described forced regeneration process includes a first temperature increase process of controlling the above-described temperature increase unit such that the temperature of the above-described DOC is increased to a first temperature, and a second temperature increase process of controlling the above-described temperature increase unit such that the temperature of the above-described DPF is increased to a second temperature which is higher than the above-described first temperature after completion of the above-described first temperature increase process. The above-described temperature increase unit includes an exhaust throttle valve disposed in the above-described exhaust passage. The above-described control method of the engine includes a step of executing a valve opening/closing operation of increasing an opening degree of the above-described exhaust throttle valve to be greater than a predetermined opening degree for a predetermined time, when the above-described forced regeneration process is switched from the above-described first temperature increase process to the above-described second temperature increase process.

With the above method (10), the control method of the engine includes a step of executing the valve opening/closing operation of increasing the opening degree of the exhaust throttle valve to be greater than the predetermined opening degree for the predetermined time, when the forced regeneration process is switched from the first temperature increase process to the second temperature increase process. Executing the above-described valve opening/closing operation, the exhaust throttle valve can flow the non-combusted fuel and the PM deposited on the exhaust throttle valve downstream of the exhaust throttle valve in the exhaust passage. Reducing the non-combusted fuel and the PM deposited on the exhaust throttle valve, it is possible to prevent the operation failure caused by fixation of the exhaust throttle valve during the second temperature increase process. That is, it is possible to prevent the actual opening degree of the exhaust throttle valve from being less than the instructed opening degree instructed by the control device. Thus, since the actual opening degree of the exhaust throttle valve is equal to the instructed opening degree instructed by the control device, it is possible to set the appropriate flow rate of the exhaust gas flowing downstream of the exhaust throttle valve in the exhaust passage during the second temperature increase process. Thus, with the above method, it is possible to prevent the abnormal increases in temperature and pressure of the exhaust gas in the exhaust passage of the engine, and to prevent the failure in the engine and the thermal deterioration of the oxidation catalyst of the DOC, during control of reducing the opening degree of the exhaust throttle valve.

(11) In some embodiments, the control method of the engine according to the above method (10) further includes a feedforward opening degree acquisition step of acquiring a feedforward opening degree, which is the opening degree of the above-described exhaust throttle valve, based on information regarding an operational condition of the above-described engine, a feedback opening degree acquisition step of acquiring a feedback opening degree, which is the opening degree of the above-described exhaust throttle valve, based on a difference between a preset target temperature and a detected temperature acquired by an exhaust gas temperature detection device capable of detecting a temperature of an exhaust gas flowing through the above-described exhaust passage, and an instructed opening degree decision step of deciding greater of the above-described feedforward opening degree, which is acquired in the above-described feedforward opening degree acquisition step, and the above-described feedback opening degree, which is acquired in the above-described feedback opening degree acquisition step, as an instructed opening degree to be instructed for the above-described exhaust throttle valve.

With the above method (11), since the control method of the engine decides the greater of the feedforward opening degree, which is acquired based on the information regarding the operational condition of the engine, and the feedback opening degree, which is acquired based on the difference between the preset target temperature and the detected temperature of the exhaust gas flowing through the exhaust passage, as the instructed opening degree of the exhaust throttle valve, it is possible to prevent the lack of the amount of the air supplied to the engine and the amount of the exhaust gas discharged from the engine, and to suppress the high temperature of the exhaust gas flowing through the exhaust passage exceeding the target temperature. Thus, with the above method, it is possible to prevent the abnormal increases in temperature and pressure of the exhaust gas in the exhaust passage of the engine, and to prevent the failure in the engine and the thermal deterioration of the oxidation catalyst of the DOC, during control of reducing the opening degree of the exhaust throttle valve.

Advantageous Effects

According to at least one embodiment of the present invention, provided is a control device capable of preventing abnormal increases in temperature and pressure of an exhaust gas in an exhaust passage of an engine, during control of reducing the opening degree of an exhaust throttle valve.

DETAILED DESCRIPTION

Figure 1:
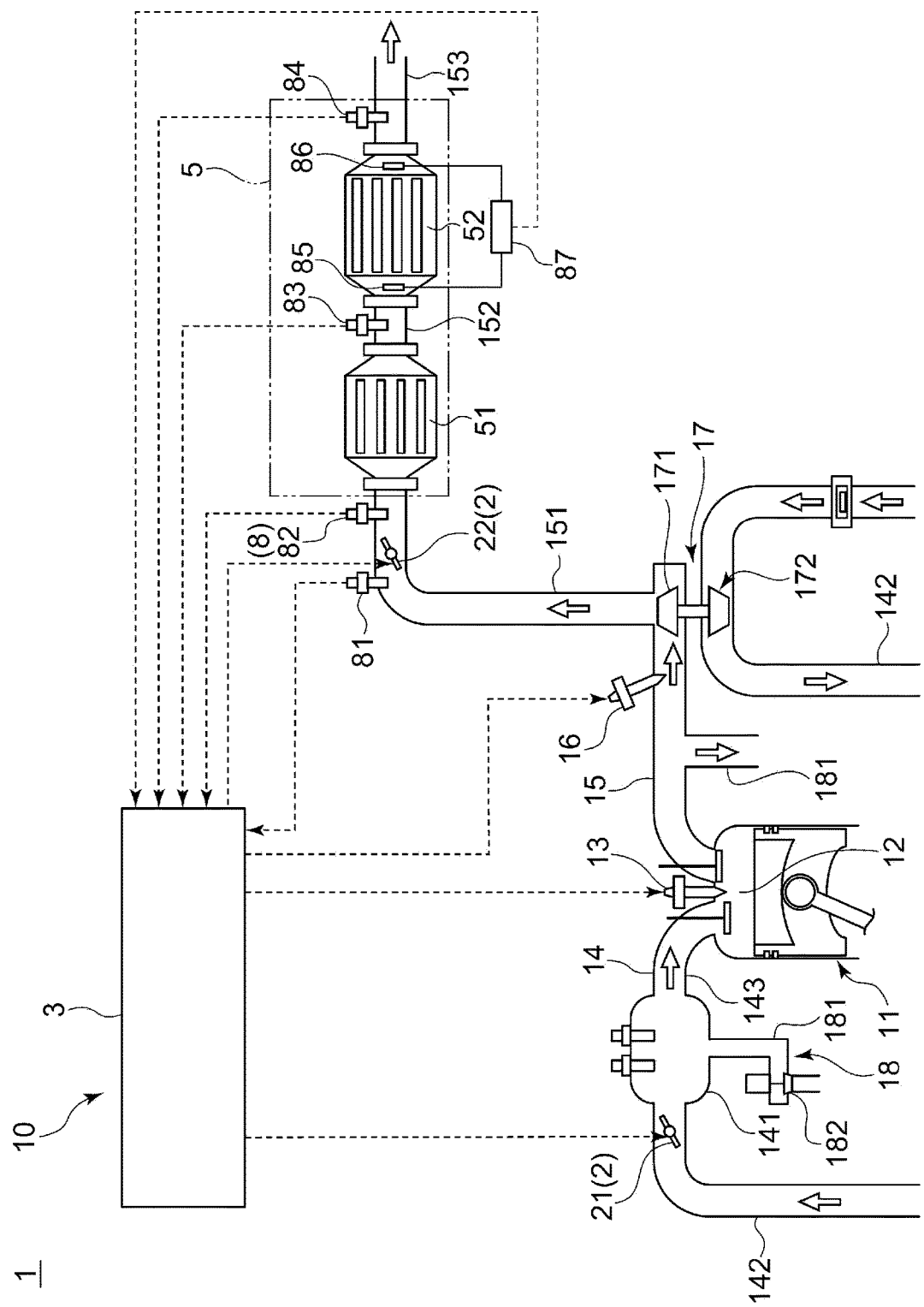
FIG. 1 is a schematic configuration diagram schematically showing an example of the overall configuration of an engine including a control device according to the first embodiment and the second embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

The same configurations are indicated by the same reference characters and may not be described again in detail.

FIG. 1 is a schematic configuration diagram schematically showing an example of the overall configuration of an engine including a control device according to the first embodiment and the second embodiment of the present invention.

As shown in FIG. 1, an exhaust gas purification device 5 includes a DOC 51 and a DPF 52. A control device 3 regenerates (recovers) the exhaust gas purification device 5 disposed in an exhaust passage 15 of an engine 1 by controlling a temperature increase unit 6 to be described later.

First, the engine 1 (diesel engine) including the control device 3 will be described. In the embodiment shown in FIG. 1, as shown in FIG. 1, the engine 1 mainly includes the above-described control device 3, the above-described exhaust gas purification device 5, an engine body 11 with a combustion chamber 12 which is defined by a cylinder head and a cylinder block, a fuel injection valve 13 for injecting a non-combusted fuel to the combustion chamber 12, an intake passage 14 of the engine 1, the exhaust passage 15 of the engine 1, and a throttle valve 2 disposed in the intake passage 14 or the exhaust passage 15 of the engine 1.

The engine body 11 is connected to the intake passage 14 and the exhaust passage 15. The intake passage 14 of the engine 1 is a passage for sending air (combustion gas) outside the engine 1 to the combustion chamber 12. The exhaust passage 15 of the engine 1 is a passage for discharging an exhaust gas discharged from the combustion chamber 12 to the outside of the engine 1.

As shown in FIG. 1, the fuel injection valve 13 is connected to a common rail (not shown) for accumulating the non-combusted fuel (high-pressure fuel), and is configured to be able to inject the above-described non-combusted fuel. Then, the fuel injection valve 13 is configured such that an injection timing of the non-combusted fuel and an injection amount of the non-combusted fuel are controlled by the control device 3. In the illustrated embodiment, the fuel injection valve 13 is mounted on the engine body 11 and is configured to be able to inject the non-combusted fuel to the combustion chamber 12. In other embodiments, the fuel injection valve 13 is mounted in the vicinity of the combustion chamber 12 in the intake passage 14 and is configured to be able to inject the non-combusted fuel to the intake passage 14.

In main injection executed during the normal operation, the non-combusted fuel injected from the fuel injection valve 13 to the combustion chamber 12 or the intake passage 14 is mixed with the air (combustion gas) sent to the combustion chamber 12 via the intake passage 14, and then combusted in the combustion chamber 12. The exhaust gas having been combusted in the combustion chamber 12 is discharged outside the engine 1 through the exhaust passage 15.

The throttle valve 2 includes an intake throttle valve 21 disposed in the intake passage 14 and an exhaust throttle valve 22 disposed in the exhaust passage 15, as shown in FIG. 1. In the illustrated embodiment, the engine 1 includes both of the intake throttle valve 21 and the exhaust throttle valve 22. In other embodiments, the engine 1 includes only the exhaust throttle valve 22 of the intake throttle valve 21 and the exhaust throttle valve 22.

Each of the intake throttle valve 21 and the exhaust throttle valve 22 includes a motor and an actuator (both of which are not shown) operating in accordance with a signal sent from the control device 3, and is configured to be changeable to an opening degree according to an instructed opening degree (instructed opening degree I, second instructed opening degree H) instructed by the control device 3. The intake throttle valve 21 can adjust the flow rate of the air (combustion gas) sent to the combustion chamber 12, by being set at the opening degree according to the instructed opening degree (instructed opening degree I, second instructed opening degree H) instructed by the control device 3. The exhaust throttle valve 22 can adjust the flow rate of an exhaust gas flowing downstream of the exhaust throttle valve 22 in the exhaust passage 15, by being set at the opening degree according to the instructed opening degree (instructed opening degree I, second instructed opening degree H) instructed by the control device 3.

As shown in FIG. 1, the above-described exhaust gas purification device 5 is a device for purifying the exhaust gas discharged from the engine body 11, and includes the above-described DOC 51 (diesel oxidization catalyst) disposed in the exhaust passage 15 and the above-described DPF 52 (diesel particulate filter) disposed downstream of the DOC 51 in the exhaust passage 15. The DPF 52 is configured to be able to collect particulate matters (PM), such as soot, contained in the exhaust gas discharged from the engine body 11. In the illustrated embodiment, the DOC 51 is disposed downstream of the exhaust throttle valve 22 in the exhaust passage 15.

The DOC 51 has a number of vent holes formed into a honeycomb shape, and includes a body of ceramic or metal which is configured to have an outer shape formed into a cylindrical shape or a cuboidal shape, and an oxidation catalyst supported by an inner surface of the body.

The DOC 51 has a function to oxidize and remove non-combusted fuel (HC) and carbon monoxide (CO) in the exhaust gas passing through the DOC 51, and to oxidize nitrogen monoxide (NO) in the exhaust gas to produce nitrogen dioxide ($NO_2$) capable of combusting and removing PM by a reaction with the PM collected by the DPF 52, by accelerating an oxidation reaction by the oxidation catalyst. Moreover, the DOC 51 has a function to increase the temperature of the exhaust gas passing through the DOC 51 and to increase the inlet temperature of the DPF 52 with heat generated by an oxidation reaction of the non-combusted fuel contained in the exhaust gas, in forced regeneration of the DPF.

The DPF 52 has a number of vent holes formed into a honeycomb shape, and is configured to have an outer shape formed into a cylindrical shape or a cuboidal shape. The DPF 52 is configured such that vent holes adjacent to each other of a number of vent holes are closed alternately on the inlet side and the outlet side to allow the exhaust gas to pass through a filtering wall (filter). Thus, the PM is removed when the exhaust gas passes through the filtering wall. The DPF 52 may support the oxidation catalyst on the inner surface thereof.

The exhaust gas sent to the exhaust gas purification device 5 is discharged outside the engine 1 after non-combusted fuel (HC) and carbon monoxide (CO) contained in the exhaust gas are removed in the DOC 51, and the PM contained in the exhaust gas is removed in the DPF 52.

While a part of the PM removed in the DPF 52 is combusted by a high-temperature exhaust gas discharged from the combustion chamber 12 during an engine operation (continuous regeneration), the remaining PM is deposited on the filtering wall of the DPF 52. Thus, the control device 3 needs to execute a forced regeneration process FRP of regenerating the filtering wall by forcibly combusting the PM deposited on the filtering wall of the DPF 52.

In the illustrated embodiment, as shown in FIG. 1, the exhaust passage 15 includes a first exhaust pipe 151 connecting a discharge port of the engine body 11 and upstream of the DOC 51, a second exhaust pipe 152 connecting downstream of the DOC 51 and upstream of the DPF 52, and a third exhaust pipe 153 connected to downstream of the DPF 52 and having an outlet opening for discharging the exhaust gas. The above-described exhaust throttle valve 22 is disposed in the first exhaust pipe 151.

As shown in FIG. 1, in the first exhaust pipe 151, an exhaust pressure sensor 81 and a DOC inlet temperature sensor 82 are disposed. The exhaust pressure sensor 81 detects a pressure in the vicinity of the exhaust throttle valve 22 as a pressure of the exhaust gas discharged from the combustion chamber 12. The DOC inlet temperature sensor 82 detects the inlet temperature of the DOC 51 as the temperature of the exhaust gas discharged from the combustion chamber 12. As shown in FIG. 1, in the second exhaust pipe 152, a DPF inlet temperature sensor 83 for detecting the inlet temperature of the DPF 52 is disposed. As shown in FIG. 1, in the third exhaust pipe 153, a DPF outlet temperature sensor 84 for detecting the outlet temperature of the DPF 52 is disposed. In the DPF 52, a DPF inlet pressure sensor 85, a DPF outlet pressure sensor 86, and a DPF differential pressure sensor 87 are disposed. Signals regarding the pressure of the exhaust gas, the inlet temperature of the DOC 51, the inlet temperature of the DPF 52, the outlet temperature of the DPF 52, the differential pressure of the DPF 52, and the like measured by the above-described sensors, respectively, are input to the control device 3 via an input/output part 31 (see FIG. 2).

Moreover, in the illustrated embodiment, as shown in FIG. 1, the intake passage 14 includes an intake manifold 141, a first intake pipe 142 connected to upstream of the intake manifold, and a second intake pipe 143 connecting downstream of the intake manifold 141 and a supply port of the engine body 11. The above-described intake throttle valve 21 is disposed in the first intake pipe 142.

In the illustrated embodiment, the control device 3 is an ECU device (electronic control unit) for controlling the engine 1. In other embodiments, the control device 3 may be implemented as one of functions (programs and circuits) of the ECU device. Alternatively, the control device 3 may be configured as another electronic control unit including a processor, independently of the above-described ECU device. The control device 3 may be configured as a microcomputer including a central processing unit (CPU), a random access memory (RAM), a read only memory (ROM), an I/O interface, and the like. Moreover, the control device 3 is configured to be able to perform control on the basis of the signals measured by the sensors, respectively, described above on the fuel injection valve 13, the intake throttle valve 21, the exhaust throttle valve 22, and the like.

Figure 2:
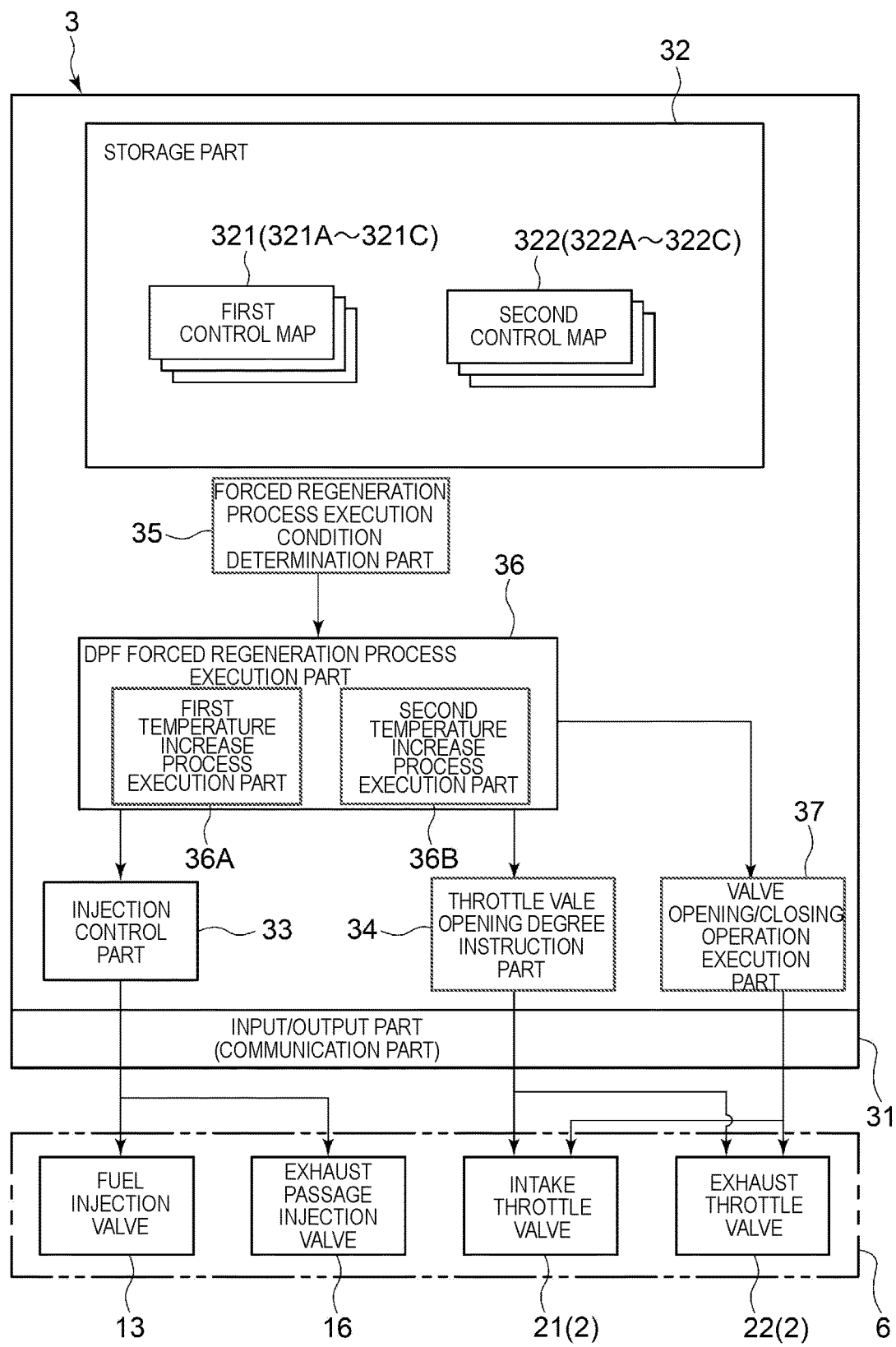
FIG. 2 is a block diagram showing an example of the control device according to the first embodiment of the present invention.

FIG. 2 is a block diagram showing an example of the control device according to the first embodiment of the present invention.

As shown in FIG. 2, the above-described temperature increase unit 6 includes the fuel injection valve 13 and the exhaust throttle valve 22. As shown in FIG. 2, the temperature increase unit 6 may further include at least one of the intake throttle valve 21 or an exhaust passage injection valve 16 to be described later.

The control device 3 is configured to be able to execute the above-described forced regeneration process FRP of removing the PM deposited on the DPF 52 by increasing the temperature of the DPF 52 with the temperature increase unit 6. The control device 3 is configured to be able to control the temperature increase unit 6 not only during execution of the forced regeneration process FRP but also during the normal operation.

The forced regeneration process FRP includes an automatic regeneration process automatically executed by the control device 3 by satisfying a predetermined forced regeneration process execution condition, and a manual regeneration process executed by a manual operation. Moreover, the forced regeneration process FRP (automatic regeneration process) includes a first temperature increase process FHP and a second temperature increase process SHP executed after the first temperature increase process FHP. The above-described predetermined forced regeneration process execution condition includes, for example, an estimated value of the PM deposition amount on the filtering wall of the DPF 52 exceeding a predetermined value, an operation time of the engine body 11 exceeding a predetermined time, and a cumulative of the fuel injection amount of the fuel injection valve 13 exceeding a predetermined value. In the illustrated embodiment, the PM deposition amount can be estimated by detecting a differential pressure between the upstream and downstream sides of the DPF 52 with a DPF differential pressure sensor 87.

In the illustrated embodiment, as shown in FIG. 2, the control device 3 includes the above-described input/output part 31, a storage part 32, an injection control part 33 for controlling execution of injection by the fuel injection valve 13, a throttle valve opening degree instruction part 34 for controlling throttling of the throttle valve 2 (intake throttle valve 21, exhaust throttle valve 22), a forced regeneration process execution condition determination part 35, a DPF forced regeneration process execution part 36, and a valve opening/closing operation execution part 37.

Figure 3A:
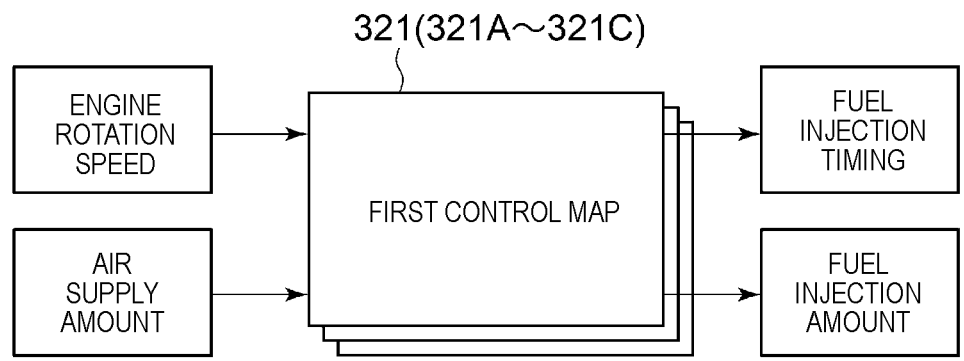
FIG. 3A is a data flow diagram of a first control map.

FIG. 3A is a data flow diagram of a first control map.

The injection control part 33 is configured to be able to control the injection timing of the non-combusted fuel and the injection amount of the non-combusted fuel injected by the fuel injection valve 13. In the illustrated embodiment, as shown in FIG. 3A, the first control map 321, which includes an engine rotation speed and the amount of air supplied to the combustion chamber 12 as input values, and an injection timing of the non-combusted fuel and an injection amount of the non-combusted fuel as output values, is prestored in the storage part 32 (see FIG. 2). As the engine rotation speed, for example, a measurement value is used, which is obtained from a rotation speed sensor (not shown) for detecting the rotation speed of a shaft (rotational shaft member) (not shown) connected to the engine body 11. Moreover, as the amount of the air supplied to the combustion chamber 12, for example, a calculation value is used, which is calculated from a measurement value obtained from an air flow meter (not shown) disposed in the intake passage 14.

In the illustrated embodiment, as shown in FIG. 3A, the first control map 321 is constituted by a plurality of control maps which include a first control map 321A corresponding to an injection method in the normal operation, a first control map 321B corresponding to the injection method in the first temperature increase process FHP, and a first control map 321C corresponding to the injection method in the second temperature increase process SHP, respectively. The first control maps 321A to 321C are different from each other in output value corresponding to the input value. In the normal operation, the injection control part 33 instructs the fuel injection valve 13 on the injection timing of the non-combusted fuel and the injection amount of the non-combusted fuel obtained from the engine rotation speed and the amount of the air supplied to the combustion chamber 12, based on the first control maps 321A to 321C corresponding to control statuses such as the first temperature increase process FHP and the second temperature increase process SHP, respectively.

Figure 3B:
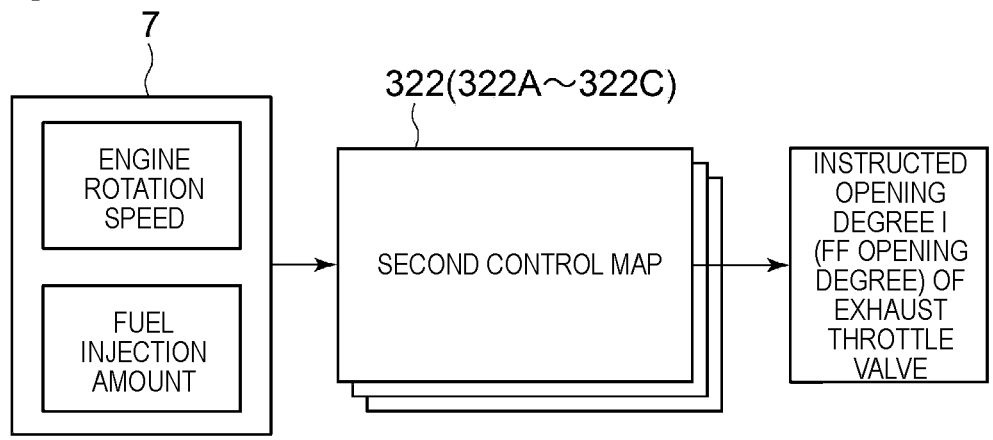
FIG. 3B is a data flow diagram of a second control map.

FIG. 3B is a data flow diagram of a second control map.

The throttle valve opening degree instruction part 34 is configured to be able to control the opening degree of the throttle valve 2 (the intake throttle valve 21 and the exhaust throttle valve 22). In the illustrated embodiment, as shown in FIG. 3B, a second control map 322, which includes information 7 regarding an operational condition of the engine as an input value, and the instructed opening degree I (feedforward opening degree FF) of the throttle valve 2 hour by hour as an output value, is prestored in the storage part 32 (see FIG. 2). The second control map 322 is constituted by a plurality of control maps individually corresponding to the intake throttle valve 21 and the exhaust throttle valve 22, respectively. Moreover, the second control map 322 is constituted by a plurality of control maps which include a second control map 322A corresponding to the instructed opening degree I in the normal operation, a second control map 322B corresponding to the instructed opening degree I in the first temperature increase process FHP, and a second control map 322C corresponding to the instructed opening degree I in the second temperature increase process SHP, respectively. The second control maps 322A to 322C are different from each other in output value corresponding to the input value.

The throttle valve opening degree instruction part 34 instructs the throttle valve 2 on the feedforward opening degree FF acquired from the information 7 regarding the operational condition of the engine as the instructed opening degree I of the throttle valve 2, based on the second control maps 322A to 322C corresponding to the individual throttle valves, and corresponding to the control statuses such as the normal operation, the first temperature increase process FHP, and the second temperature increase process SHP, respectively. In the embodiment shown in FIG. 3B, the information 7 regarding the operational condition of the engine includes the engine rotation speed and the injection amount of the non-combusted fuel.

Figure 4:
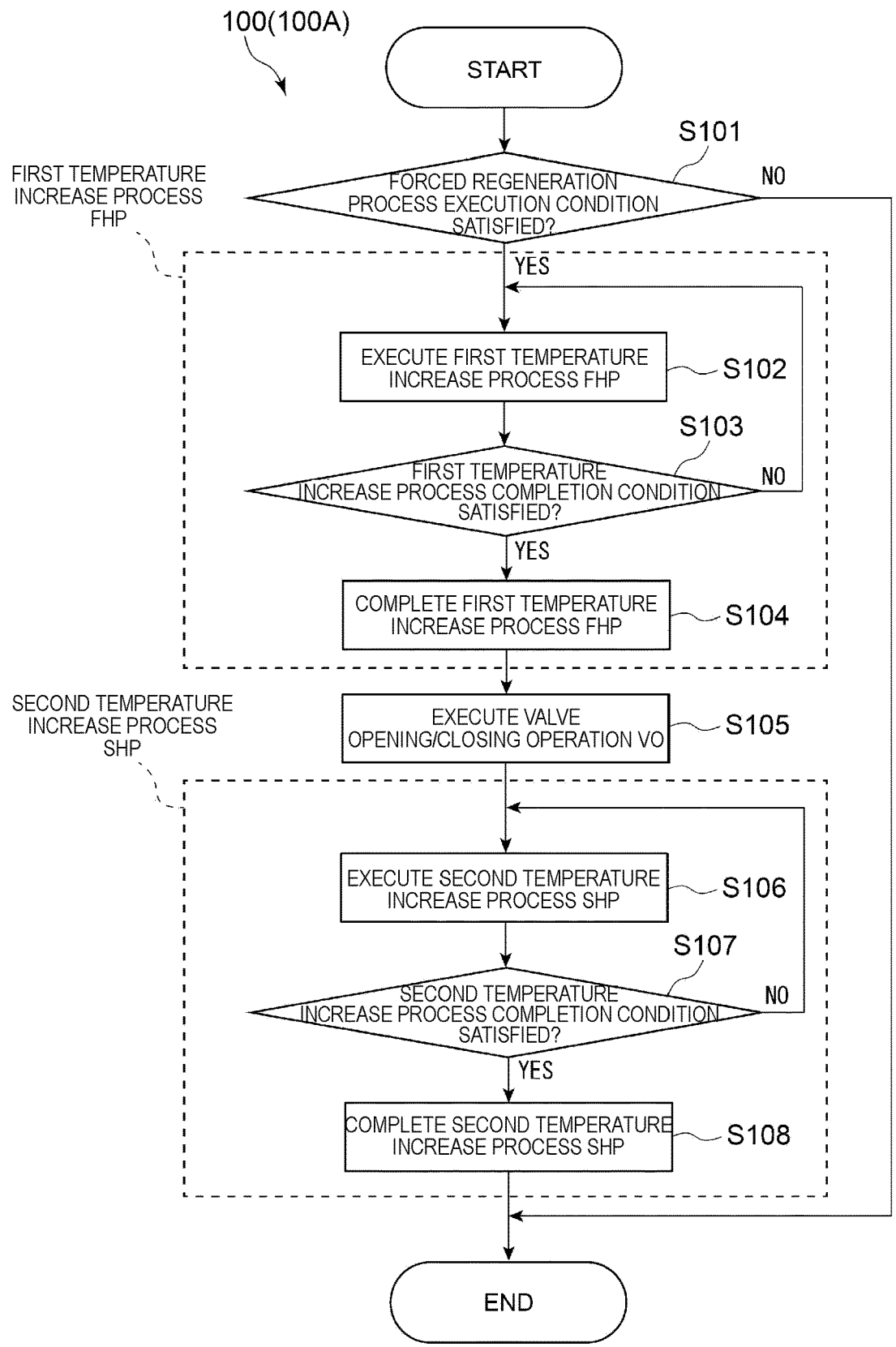
FIG. 4 is a flowchart of an engine control method according to the first embodiment of the present invention.
Figure 5:
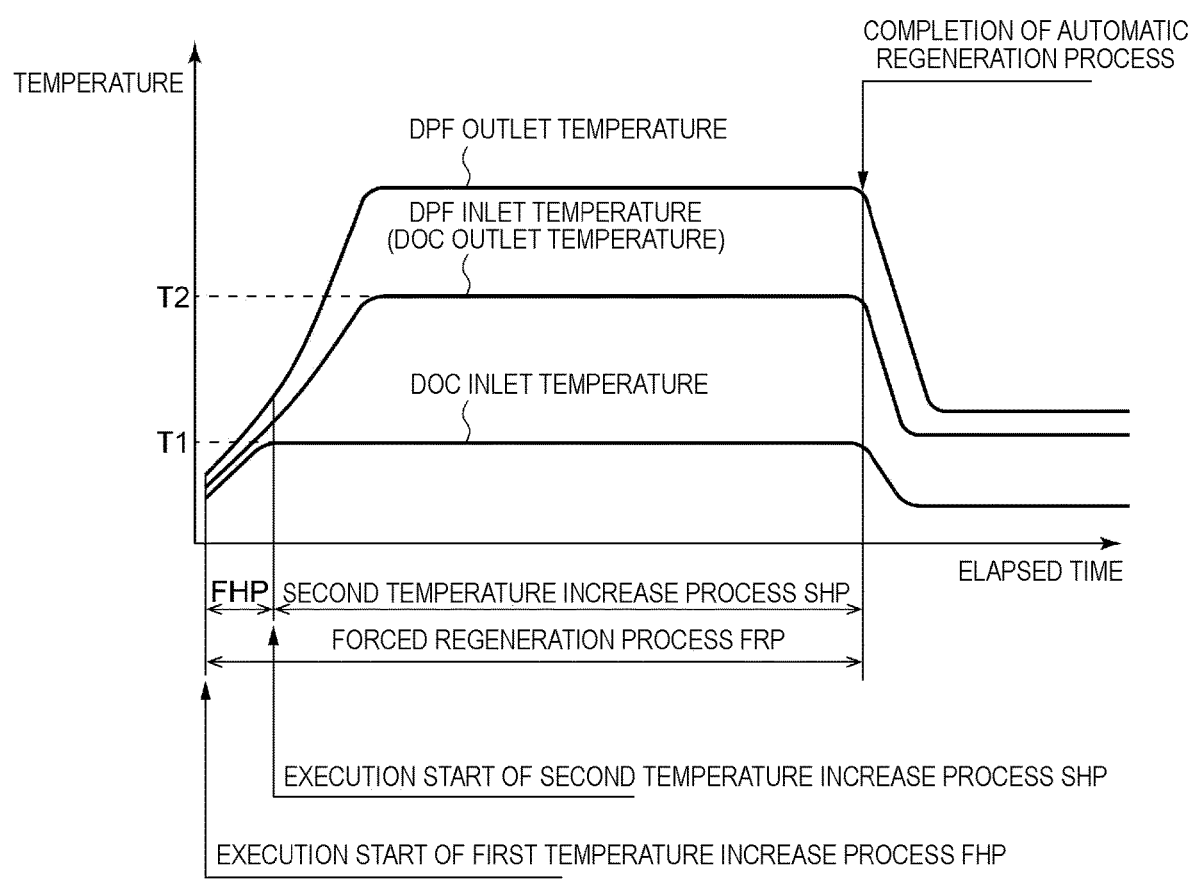
FIG. 5 is a graph showing respective temperature changes of DPF inlet and outlet temperatures, and DOC inlet and outlet temperatures during an automatic regeneration process.
Figure 6:
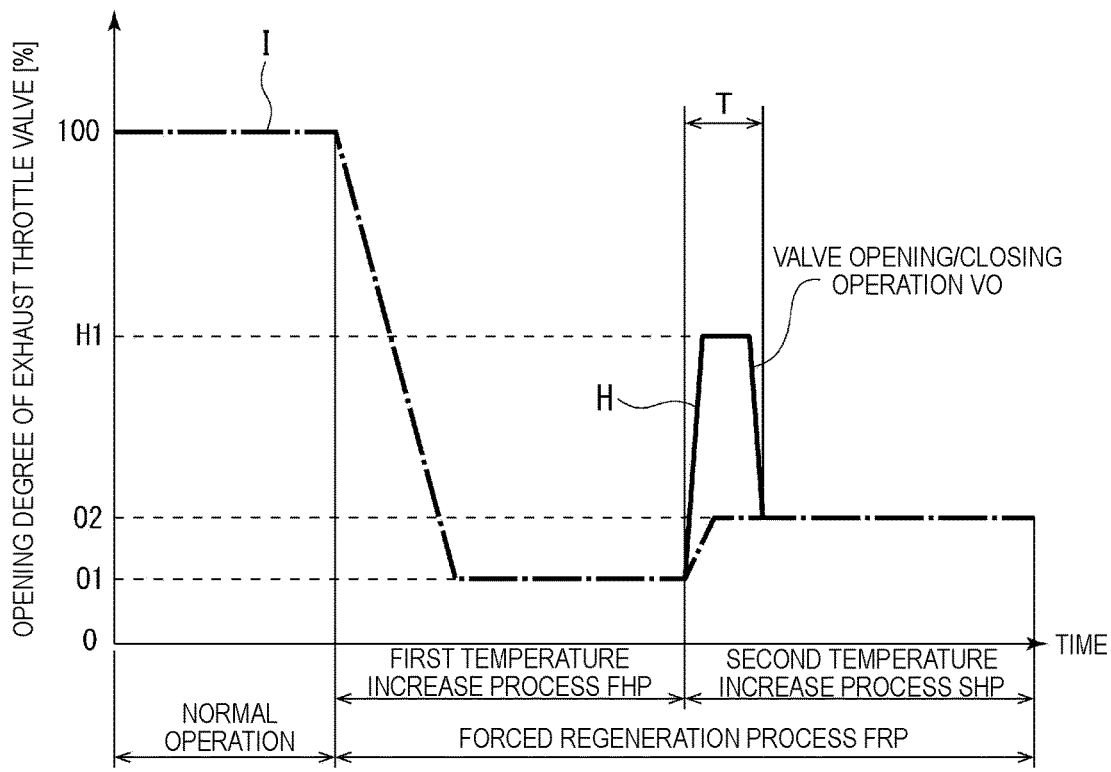
FIG. 6 is a graph for describing a valve opening/closing operation by an exhaust throttle valve, the graph showing a relationship between an elapsed time and the opening degree of the exhaust throttle valve.
Figure 7:
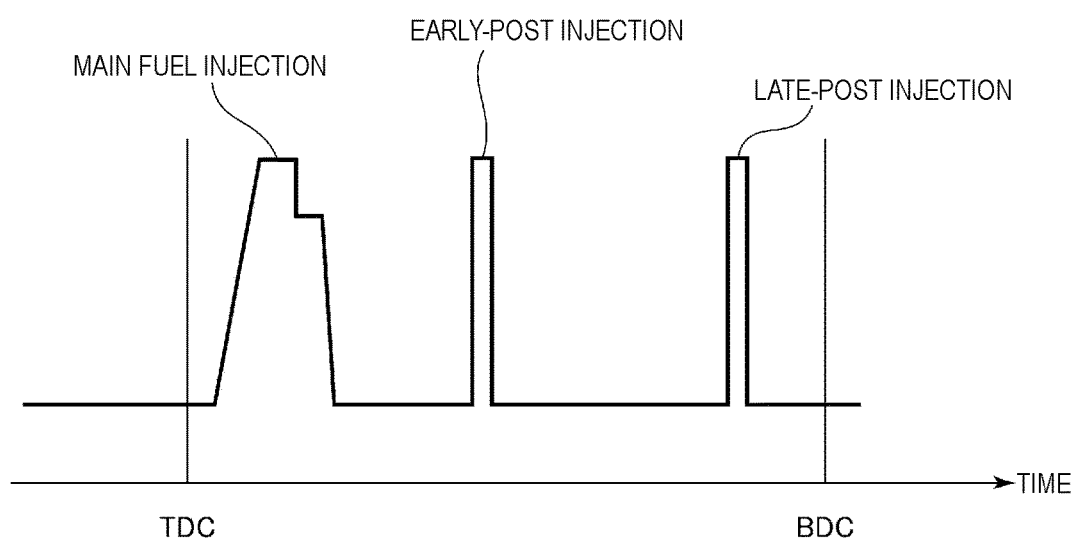
FIG. 7 is a chart for describing early-post injection and late-post injection.

FIG. 4 is a flowchart of an engine control method according to the first embodiment of the present invention. FIG. 5 is a graph showing respective temperature changes of DPF inlet and outlet temperatures, and DOC inlet and outlet temperatures during the automatic regeneration process. FIG. 6 is a graph for describing a valve opening/closing operation by the exhaust throttle valve, the graph showing a relationship between an elapsed time and the opening degree of the exhaust throttle valve. FIG. 7 is a chart for describing early-post injection and late-post injection.

An engine control method 100 (100A) and the configuration of the above-described control device 3 according to some embodiments will be described below with reference to FIGS. 4 to 7. The engine control method 100 (100A) is a method for controlling the above-described engine 1 for executing the above-described forced regeneration process FRP.

In the illustrated embodiment, as shown in FIG. 4, the engine control method 100 (100A) includes steps S101 to S108.

In step 101, it is determined whether the above-described forced regeneration process execution condition is satisfied. If the forced regeneration process execution condition is not satisfied ("No" in S101), the forced regeneration process FRP (automatic regeneration process) is not executed. In the above-described control device 3, the forced regeneration process execution condition determination part 35 performs the determination in step 101. That is, the forced regeneration process execution condition determination part 35 is configured to be able to determine whether the above-described forced regeneration process execution condition is satisfied. In the illustrated embodiment, the forced regeneration process execution condition determination part 35 determines that the forced regeneration process execution condition is satisfied, if at least one of the estimated value of the PM deposition amount exceeding the predetermined value, the operation time of the engine body 11 exceeding the predetermined time, or the cumulative of the fuel injection amount of the fuel injection valve 13 exceeding the predetermined value is satisfied.

If the forced regeneration process execution condition is satisfied ("Yes" in S101), the first temperature increase process FHP (forced regeneration process FRP) is executed (S102). In the above-described control device 3, the DPF forced regeneration process execution part 36 executes the forced regeneration process FRP. That is, the DPF forced regeneration process execution part 36 is configured to execute the forced regeneration process FRP (automatic regeneration process), if the forced regeneration process execution condition is satisfied. The DPF forced regeneration process execution part 36 is configured to instruct the injection control part 33 and the throttle valve opening degree instruction part 34 to perform corresponding control in the DPF forced regeneration process FRP.

In the illustrated embodiment, the DPF forced regeneration process execution part 36 includes a first temperature increase process execution part 36A and a second temperature increase process execution part 36B. Then, in the first temperature increase process FHP, each of the injection control part 33 and the throttle valve opening degree instruction part 34 is instructed by the first temperature increase process execution part 36A to perform control corresponding to the control map (first control map 321B, second control map 322B) in the first temperature increase process FHP. Moreover, in the second temperature increase process SHP, each of the injection control part 33 and the throttle valve opening degree instruction part 34 is instructed by the second temperature increase process execution part 36B to perform control corresponding to the control map (first control map 321C, second control map 322C) in the second temperature increase process SHP.

As shown in FIG. 5, the first temperature increase process execution part 36A is configured to be able to execute the first temperature increase process FHP of controlling the temperature increase unit 6 such that the inlet temperature of the DOC 51 is increased to a first temperature T1 which is an activation temperature (for example, 250° C.) at which the DOC 51 is activated. In the illustrated embodiment, as shown in FIG. 6, with the exhaust throttle valve 22 serving as the temperature increase unit 6, the inlet temperature of the DOC 51 is increased by reducing the instructed opening degree I of the exhaust throttle valve 22 from a fully open condition (100%) in the normal operation to a first opening degree O1 to reduce the flow rate of the exhaust gas flowing downstream of the exhaust throttle valve 22 in the exhaust passage 15.

In other embodiments, with the fuel injection valve 13 serving as the temperature increase unit 6, the inlet temperature of the DOC 51 disposed downstream of the combustion chamber 12 in a flow direction of the exhaust gas discharged from the combustion chamber 12 may be increased by increasing the temperature of the exhaust gas without influencing the output of the engine 1 in the above-described early-post injection. Moreover, with a common rail pressure control unit (not shown) for controlling a common rail pressure, at which the fuel is injected, serving as the temperature increase unit 6, the inlet temperature of the DOC 51 may be increased by controlling the common rail pressure. Moreover, with at least two of the exhaust throttle valve 22, the fuel injection valve 13, or the common rail pressure control unit (not shown) serving as the temperature increase units 6, the inlet temperature of the DOC 51 may be increased. As shown in FIG. 7, the early-post injection is a first post injection where a smaller amount of fuel than in main injection is injected while a pressure in the combustion chamber 12 immediately after injection of a main fuel is still high, in the step of injecting the fuel to the combustion chamber 12. In the early-post injection, unlike late-post injection to be described later, the fuel is injected after the main injection and at a timing contributing to combustion in the combustion chamber 12.

If a completion condition of the first temperature increase process FHP is not satisfied ("No" in S101), that is, if the inlet temperature of the DOC 51 is less than the first temperature T1, the first temperature increase process FHP is executed until the completion condition is satisfied. Moreover, if the completion condition of the first temperature increase process FHP is satisfied ("Yes" in S101), that is, if the inlet temperature of the DOC 51 exceeds the first temperature T1, the first temperature increase process FHP is completed (S104).

As shown in FIG. 4, after completion of the first temperature increase process FHP, the second temperature increase process SHP is executed (S106). The DPF forced regeneration process execution part 36 is configured to be switchable from the first temperature increase process FHP executed by the first temperature increase process execution part 36A to the second temperature increase process SHP executed by the second temperature increase process execution part 36B.

As shown in FIG. 5, the second temperature increase process execution part 36B is configured to be able to execute the second temperature increase process SHP of controlling the temperature increase unit 6 such that the temperature of the DPF 52 is increased to a second temperature T2 which is higher than the first temperature T1 after completion of the first temperature increase process FHP. In the illustrated embodiment, as shown in FIG. 6, with the exhaust throttle valve 22 serving as the temperature increase unit 6, the instructed opening degree I of the exhaust throttle valve 22 is opened from the first opening degree O1 to a second opening degree O2 to increase the flow rate of the exhaust gas flowing downstream of the exhaust throttle valve 22 in the exhaust passage 15. Moreover, in the illustrated embodiment, the fuel injection valve 13 further serves as the temperature increase unit 6. During the second temperature increase process SHP, the above-described injection control part 33 instructs the fuel injection valve 13 on the late-post injection. With the late-post injection, the non-combusted fuel flows out of the combustion chamber 12 to the exhaust passage 15, and the discharged non-combusted fuel flows into the DOC 51 to be oxidized and generate heat, thereby increasing the inlet temperature of the DPF 52 to the second temperature T2. Moreover, since the temperature of the DPF 52 is increased to the second temperature T2, it is possible to combust the PM deposited on the DPF 52. In other embodiments, during the second temperature increase process SHP, the above-described injection control part 33 instructs the fuel injection valve 13 on the early-post injection and the late-post injection.

The late-post injection is a second post injection where the fuel is injected at a timing (in the vicinity of a bottom dead center) that does not contribute to combustion in the combustion chamber 12 after the early-post injection. In the exemplification of FIG. 7, while a piston disposed on the engine body 11 moves from the top dead center (TDC) to the bottom dead center (BDC), the main fuel injection is performed when the piston passes the top dead center, and then the early-post injection is performed. Then, after early-post injection and before the piston reaches the bottom dead center (BDC) from the top dead center (TDC), the late-post injection is performed.

If a completion condition of the second temperature increase process SHP is not satisfied ("No" in S107 7), that is, if the inlet temperature of the DPF 52 is not increased to the second temperature T2 for a predetermined period of time, the second temperature increase process SHP is executed until the completion condition is satisfied. Moreover, if the completion condition of the second temperature increase process SHP is satisfied ("Yes" in S107), that is, if the inlet temperature of the DPF 52 is increased to the second temperature T2 (temperature increase is maintained) for the predetermined period of time, the second temperature increase process SHP is completed (S108). The DPF forced regeneration process execution part 36 may complete the second temperature increase process SHP, if the late-post injection is performed for not less than a predetermined time, and the PM deposition amount becomes not greater than a threshold.

In place of or in conjunction with the late-post injection of the fuel injection valve 13, the non-combusted fuel may be injected from the exhaust passage injection valve 16 (see FIG. 1) disposed in the exhaust passage 15. In this case, the injection control part 33 may control execution of injection of the non-combusted fuel not only by the fuel injection valve 13 but also by the exhaust passage injection valve 16. That is, the injection control part 33 is configured to be able to control the injection timing of the non-combusted fuel and the injection amount of the non-combusted fuel injected by the exhaust passage injection valve 16. Moreover, as with the first control map 321 corresponding to the fuel injection valve 13, a control map corresponding to the exhaust passage injection valve 16 may be prestored in the storage part 32.

As shown in FIG. 4, 6, when the forced regeneration process FRP is switched from the first temperature increase process FHP to the second temperature increase process SHP, the exhaust throttle valve 22 executes a valve opening/closing operation VO of increasing the opening degree of the exhaust throttle valve 22 to be greater than a predetermined opening degree (instructed opening degree I) for a predetermined time T (S105). In the above-described control device 3, the valve opening/closing operation execution part 37 causes the exhaust throttle valve 22 to execute the valve opening/closing operation VO. That is, when the forced regeneration process FRP is switched from the first temperature increase process FHP to the second temperature increase process SHP, the valve opening/closing operation execution part 37 is configured to cause the exhaust throttle valve 22 to execute the valve opening/closing operation VO of increasing the opening degree of the exhaust throttle valve 22 to be greater than the predetermined opening degree (instructed opening degree I) for the predetermined time T. In the illustrated embodiment, the predetermined time T is not greater than one second.

The valve opening/closing operation execution part 37 is configured to be able to control the opening degree of the exhaust throttle valve 22. More specifically, the valve opening/closing operation execution part 37 is configured to instruct the exhaust throttle valve 22 on the second instructed opening degree H which is an instructed opening degree different from the instructed opening degree I instructed for the exhaust throttle valve 22 by the above-described throttle valve opening degree instruction part 34. A maximum opening degree H1 of the second instructed opening degree H is greater than a maximum opening degree of the instructed opening degree I during execution of the forced regeneration process FRP.

During execution of the valve opening/closing operation VO, as shown in FIG. 6, the second instructed opening degree H of the exhaust throttle valve 22 by the valve opening/closing operation execution part 37 is prioritized over the instructed opening degree I of the exhaust throttle valve 22 by the throttle valve opening degree instruction part 34. During execution of the valve opening/closing operation VO, that is, in a period from the start of the valve opening/closing operation VO to the end of the valve opening/closing operation VO, as indicated by a solid line in FIG. 6, the control device 3 instructs the exhaust throttle valve 22 on the second instructed opening degree H. The instructed opening degree I when the valve opening/closing operation VO is started and the instructed opening degree I when the valve opening/closing operation VO is ended may be equal to or different from each other.

The above-described forced regeneration process FRP includes the first temperature increase process FHP of controlling the temperature increase unit 6 such that the temperature of the DOC 51 is increased to the first temperature T1, and the second temperature increase process SHP of controlling the temperature increase such that the temperature of the DPF 52 is increased to the second temperature T2 which is higher than the first temperature T1 after completion of the first temperature increase process FHP. Then, the temperature increase unit 6 includes the exhaust throttle valve 22 disposed in the exhaust passage 15. That is, during the forced regeneration process FRP, control of reducing (decreasing) the opening degree of the exhaust throttle valve 22 is performed. In the second temperature increase process SHP, temperature increase is performed in which the temperature is increased to the second temperature T2 higher than the first temperature T1 which is the increased temperature in the first temperature increase process FHP. Thus, during the second temperature increase process SHP, compared with during the first temperature increase process FHP, there is an increased possibility of inviting abnormal increases in temperature and pressure of the exhaust gas in the exhaust passage 15 of the engine body 11 (engine) when the actual opening degree of the exhaust throttle valve 22 is less than the instructed opening degree I instructed by the control device 3 due to the operation failure caused by fixation of the exhaust throttle valve 22.

The control device 3 according to some embodiments includes the above-described valve opening/closing operation execution part 37 configured to cause the exhaust throttle valve 22 to execute the valve opening/closing operation VO of increasing the opening degree of the exhaust throttle valve 22 to be greater than the predetermined opening degree (instructed opening degree I) for the predetermined time T, when the forced regeneration process FRP is switched from the first temperature increase process FHP to the second temperature increase process SHP.

With the above configuration, the control device 3 causes the exhaust throttle valve 22 to execute the valve opening/closing operation VO of increasing the opening degree of the exhaust throttle valve 22 to be greater than the predetermined opening degree (instructed opening degree I) for the predetermined time T, when the forced regeneration process FRP is switched from the first temperature increase process FHP to the second temperature increase process SHP. Executing the above-described valve opening/closing operation VO, the exhaust throttle valve 22 can flow the non-combusted fuel and the PM deposited on the exhaust throttle valve 22 downstream of the exhaust throttle valve 22 in the exhaust passage 15. Reducing the non-combusted fuel and the PM deposited on the exhaust throttle valve 22, it is possible to prevent the operation failure caused by fixation of the exhaust throttle valve 22 during the second temperature increase process SHP. That is, it is possible to prevent the actual opening degree of the exhaust throttle valve 22 from being less than the instructed opening degree I instructed by the control device 3. Thus, since the actual opening degree of the exhaust throttle valve 22 is equal to the instructed opening degree I instructed by the control device 3, it is possible to set an appropriate flow rate of the exhaust gas flowing downstream of the exhaust throttle valve 22 in the exhaust passage 15 during the second temperature increase process SHP. Thus, with the above configuration, it is possible to prevent the abnormal increases in temperature and pressure of the exhaust gas in the exhaust passage 15 of the engine body 11 (engine), and to prevent the failure in the engine body 11 (engine) and the thermal deterioration of the oxidation catalyst of the DOC 51, during control of reducing the opening degree of the exhaust throttle valve 22.

In some embodiments, the above-described valve opening/closing operation execution part 37 is configured to instruct the exhaust throttle valve 22 such that at least one of a speed at which the exhaust throttle valve 22 is opened or a speed at which the exhaust throttle valve 22 is closed in execution of the valve opening/closing operation VO is not greater than a predetermined speed, that is, an inclination of the second instructed opening degree H of the exhaust throttle valve 22 in FIG. 6 is not greater than a predetermined angle. If the speed at which the exhaust throttle valve 22 is opened and the speed at which the exhaust throttle valve 22 is closed in execution of the valve opening/closing operation VO exceed the predetermined speed, the amount of the exhaust gas flowing downstream of the exhaust throttle valve 22 in the exhaust passage 15 is rapidly increased/decreased, increasing a possibility of occurrence of air flow noise (noise). With the above configuration, since at least one of the speed at which the exhaust throttle valve 22 is opened or the speed at which the exhaust throttle valve 22 is closed in execution of the valve opening/closing operation VO is not greater than the predetermined speed, it is possible to suppress occurrence of the air flow noise.

In some embodiments, as shown in FIG. 6, the above-described valve opening/closing operation execution part 37 is configured to instruct the exhaust throttle valve 22 on an opening degree, which is less than the fully open opening degree, as the opening degree of the exhaust throttle valve 22 in execution of the valve opening/closing operation VO. If the opening degree of the exhaust throttle valve 22 in execution of the valve opening/closing operation VO is fully open, the amount of the exhaust gas flowing downstream of the exhaust throttle valve 22 in the exhaust passage 15 is rapidly touched, which may result in the exhaust gas which is not purified by the exhaust gas purification device 5 being discharged to the atmosphere. With the above configuration, since the opening degree of the exhaust throttle valve 22 in execution of the valve opening/closing operation VO is less than the fully open opening degree, it is possible to suppress discharge of the exhaust gas, which is not purified by the exhaust gas purification device 5, to the atmosphere.

In some embodiments, as shown in FIG. 6, provided that the maximum opening degree of the exhaust throttle valve 22 in execution of the valve opening/closing operation VO is H1, the above-described H1 is not less than 40% and not greater than 80%. The above-described H1 is preferably not less than 50% and not greater than 70%. In this case, it is possible to prevent the operation failure caused by fixation of the exhaust throttle valve 22, and to suppress discharge of the exhaust gas, which is not purified by the exhaust gas purification device 5, to the atmosphere.

In some other embodiments, provided that a maximum opening degree of the exhaust throttle valve 22 during the forced regeneration process FRP is Omax, the above-described H1 satisfies a condition of 2×Omax<H1<8×Omax. More preferably, the above-described H1 satisfies a condition of 2.5×Omax<H1<7×Omax. In this case, it is possible to prevent the operation failure caused by fixation of the exhaust throttle valve 22, and to suppress discharge of the exhaust gas, which is not purified by the exhaust gas purification device 5, to the atmosphere.

In some embodiments, the above-described valve opening/closing operation execution part 37 is configured to cause the exhaust throttle valve 22 to execute the valve opening/closing operation VO before the late-post injection in the second temperature increase process SHP. During execution of the late-post injection, the non-combusted fuel passes through the exhaust throttle valve 22 having the decreased opening degree, which is likely to cause the operation failure due to fixation of the exhaust throttle valve 22. With the above configuration, executing the valve opening/closing operation VO before the late-post injection in the second temperature increase process SHP to reduce the non-combusted fuel and the PM deposited on the exhaust throttle valve 22, it is possible to prevent the operation failure caused by fixation of the exhaust throttle valve 22 during the late-post injection.

As shown in FIG. 4, the engine control method 100 (100A) according to some embodiments includes step S105 of executing the valve opening/closing operation VO of increasing the opening degree of the exhaust throttle valve 22 to be greater than the predetermined opening degree (instructed opening degree I) for the predetermined time T, when the forced regeneration process FRP is switched from the above-described first temperature increase process FHP to the above-described second temperature increase process SHP.

With the above method, the engine control method 100 (100A) includes step S105 of executing the valve opening/closing operation VO of increasing the opening degree of the exhaust throttle valve 22 to be greater than the predetermined opening degree (instructed opening degree I) for the predetermined time T, when the forced regeneration process FRP is switched from the first temperature increase process FHP to the second temperature increase process SHP. Executing the valve opening/closing operation VO, the exhaust throttle valve 22 can flow the non-combusted fuel and the PM deposited on the exhaust throttle valve 22 downstream of the exhaust throttle valve 22 in the exhaust passage 15. Reducing the non-combusted fuel and the PM deposited on the exhaust throttle valve 22, it is possible to prevent the operation failure caused by fixation of the exhaust throttle valve 22 during the second temperature increase process SHP. That is, it is possible to prevent the actual opening degree of the exhaust throttle valve 22 from being less than the instructed opening degree I instructed by the control device 3. Thus, since the actual opening degree of the exhaust throttle valve 22 is equal to the instructed opening degree I instructed by the control device 3, it is possible to set an appropriate flow rate of the exhaust gas flowing downstream of the exhaust throttle valve 22 in the exhaust passage 15 during the second temperature increase process SHP. Thus, with the above method, it is possible to prevent the abnormal increases in temperature and pressure of the exhaust gas in the exhaust passage 15 of the engine body 11 (engine), and to prevent the failure in the engine body 11 (engine) and the thermal deterioration of the oxidation catalyst of the DOC 51, during control of reducing the opening degree of the exhaust throttle valve 22.

In some embodiments, as shown in FIG. 1, the above-described engine 1 further includes a turbocharger 17 disposed between the first exhaust pipe 151 and the first intake pipe 142. In the illustrated embodiment, as shown in FIG. 1, the turbocharger 17 includes an exhaust turbine 171 disposed upstream of the DOC 51 and the exhaust throttle valve 22 of the first exhaust pipe 151, and a compressor 172 disposed in the first intake pipe 142.

The exhaust turbine 171 is rotary driven by the exhaust gas discharged from the engine body 11. The compressor 172 is rotary driven synchronously with the rotary drive of the exhaust turbine 171, thereby compressing air (combustion gas) in the compressor 172. The air (combustion gas) compressed by the compressor 172 passes through the intake throttle valve 21, and then flows into the combustion chamber 12. At this time, narrowing the intake throttle valve 21, the flow rate of the air (combustion gas) flowing into the combustion chamber 12 is restricted. As shown in FIG. 1, the exhaust gas having driven the exhaust turbine 171 passes through the exhaust throttle valve 22, and then flows into the exhaust gas purification device 5. At this time, narrowing the exhaust throttle valve 22, the flow rate of the exhaust gas flowing into the exhaust gas purification device 5 is restricted. In other embodiments, the exhaust throttle valve 22 may be disposed upstream of the exhaust turbine 171 of the first exhaust pipe 151.

In some embodiments, as shown in FIG. 1, the above-described engine 1 further includes an EGR device 18 for returning, upstream of the combustion chamber 12, a part of the exhaust gas discharged from the combustion chamber 12 as an EGR gas. The EGR device 18 includes an EGR pipe 181 coupled to the intake passage 14 and the exhaust passage 15, and an EGR valve 182 disposed in the EGR pipe 181. In the illustrated embodiment, the EGR pipe 181 has one end connected to upstream of the turbocharger 17 and the exhaust throttle valve 22 in the exhaust passage 15, and branches from the exhaust passage 15. Moreover, the EGR pipe 181 has another end connected to the intake manifold 141 disposed downstream of the intake throttle valve 21 in the intake passage 14. The opening degree of the EGR valve 182 is controlled by the throttle valve opening degree instruction part 34 of the control device 3, thereby controlling the flow rate of the EGR gas flowing through the EGR pipe 181.

The control device and the engine control method according to the second embodiment of the present invention will be described below. The control device and the engine control method according to the second embodiment are different from the control device and the engine control method according to the first embodiment in unit and method for deciding the instructed opening degree I of the exhaust throttle valve 22. The control device and the engine control method according to the second embodiment may be combined with the control device and the engine control method according to the first embodiment, or may be used by themselves.

In the illustrated embodiment, the above-described engine 1 mainly includes the above-described control device 3, the above-described exhaust gas purification device 5, the above-described engine body 11, the above-described intake passage 14, the above-described exhaust passage 15, and the above-described throttle valve 2 including the above-described exhaust throttle valve 22.

Figure 8:
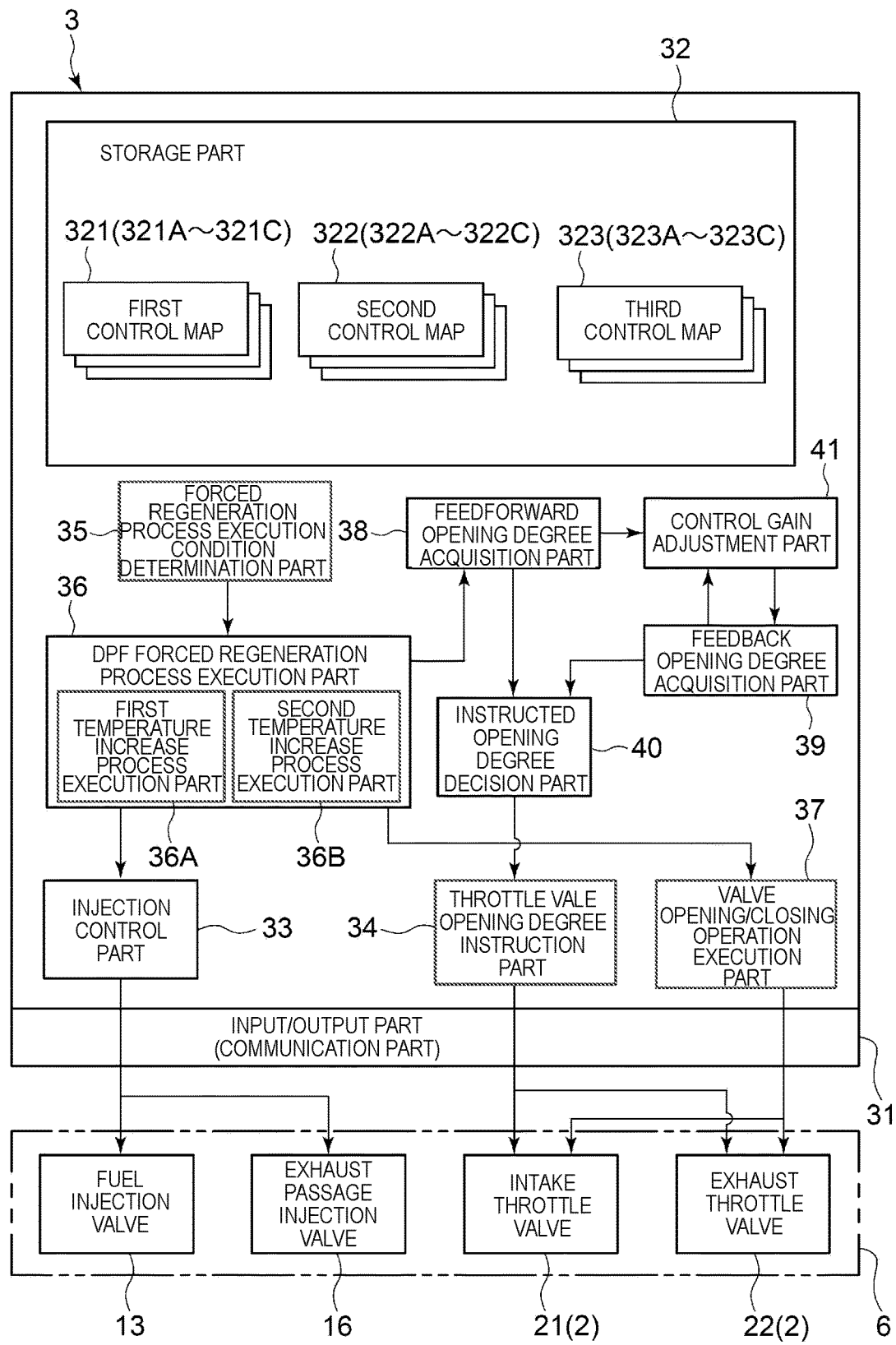
FIG. 8 is a block diagram showing an example of the control device according to the second embodiment of the present invention.
Figure 9:
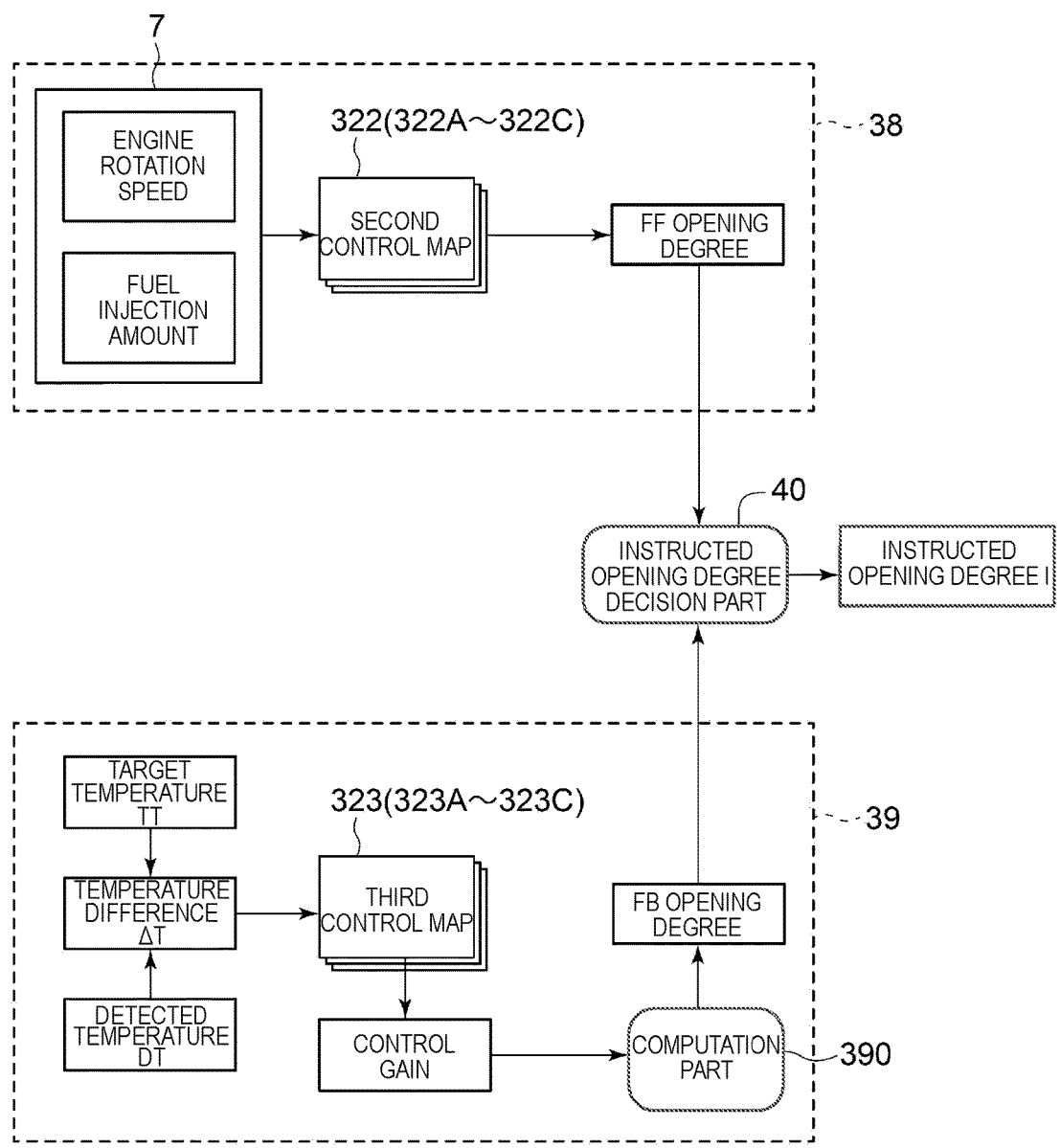
FIG. 9 is a data flow diagram for describing a method of deciding an instructed opening degree of the exhaust throttle valve in the control device.

FIG. 8 is a block diagram showing an example of the control device according to the second embodiment of the present invention. FIG. 9 is a data flow diagram for describing a method for deciding the instructed opening degree of the exhaust throttle valve in the control device.

In the illustrated embodiment, as shown in FIG. 8, the above-described control device 3 further includes a feedforward opening degree acquisition part 38, a feedback opening degree acquisition part 39, and an instructed opening degree decision part 40.

As shown in FIG. 9, as with the above-described throttle valve opening degree instruction part 34 in the first embodiment, the feedforward opening degree acquisition part 38 is configured to be able to acquire the feedforward opening degree FF, which is the opening degree of the exhaust throttle valve 22, based on the information 7 regarding the operational condition of the engine. In the illustrated embodiment, as shown in FIG. 9, the feedforward opening degree acquisition part 38 is configured to be able to acquire the feedforward opening degree FF from the information 7 regarding the operational condition of the engine based on the second control maps 322A to 322C corresponding to the exhaust throttle valve 22, and corresponding to the control statuses such as the normal operation, the first temperature increase process FHP, and the second temperature increase process SHP, respectively.

As shown in FIG. 9, the feedback opening degree acquisition part 39 is configured to be able to acquire a feedback opening degree FB, which is the opening degree of the exhaust throttle valve 22, based on a difference (temperature difference ΔT) between a preset target temperature TT and a detected temperature DT acquired by the exhaust gas temperature detection device 8 capable of detecting the temperature of the exhaust gas flowing through the exhaust passage 15. In the illustrated embodiment, the exhaust gas temperature detection device 8 is constituted by the DOC inlet temperature sensor 82 for detecting the inlet temperature of the DOC 51 described above. In other embodiments, the exhaust gas temperature detection device 8 may be a temperature sensor disposed in the first exhaust pipe 151.

Moreover, in the illustrated embodiment, as shown in FIG. 9, a third control map 323, which includes the above-described temperature difference ΔT as an input value, and a control gain as an output value, is prestored in the storage part 32 (see FIG. 8). The third control map 323 is constituted by a plurality of control maps which include a third control map 323A corresponding to the control gain in the normal operation, a third control map 323B corresponding to the control gain in the first temperature increase process FHP, and a third control map 323C corresponding to the control gain in the second temperature increase process SHP, respectively. The third control maps 323A to 323C are different from each other in output value corresponding to the input value. The feedback opening degree acquisition part 39 is configured to be able to acquire the control gain from the temperature difference ΔT based on the third control maps 323A to 323C corresponding to the control statuses such as the normal operation, the first temperature increase process FHP, and the second temperature increase process SHP, respectively. The control gain includes a proportional gain, an integral gain, and a derivative gain.

In the illustrated embodiment, a computation part 390 of the feedback opening degree acquisition part 39 calculates the feedback opening degree FB from the control gain acquired from the above-described third control map 323, by using the known PID control operation. More specifically, the computation part 390 calculates a control amount represented by a sum of a proportional term, an integral term, and a derivative term so that the target temperature TT and the detected temperature DT coincide with each other, and calculates the feedback opening degree FB based on the above-described control amount. In other embodiments, the feedback opening degree FB may be calculated by using the known P control operation or PI control operation.

The instructed opening degree decision part 40 is configured to decide greater of the feedforward opening degree FF, which is acquired by the feedforward opening degree acquisition part 38, and the feedback opening degree FB, which is acquired by the feedback opening degree acquisition part 39, as the instructed opening degree I to be instructed for the exhaust throttle valve 22. The instructed opening degree I decided by the instructed opening degree decision part 40 is instructed for the exhaust throttle valve 22 via the throttle valve opening degree instruction part 34. That is, the exhaust throttle valve 22 is controlled by the control device 3 to the opening degree according to the instructed opening degree I decided by the instructed opening degree decision part 40.

In some embodiments, the above-described control device 3 further includes the feedforward opening degree acquisition part 38, the feedback opening degree acquisition part 39, and the instructed opening degree decision part 40. The feedforward opening degree acquisition part 38 is configured to be able to acquire the feedforward opening degree FF, which is the opening degree of the exhaust throttle valve 22, based on the information 7 regarding the operational condition of the engine. The feedback opening degree acquisition part 39 is configured to be able to acquire the feedback opening degree FB, which is the opening degree of the exhaust throttle valve 22, based on the difference between the preset target temperature TT and the detected temperature DT acquired by the exhaust gas temperature detection device 8 capable of detecting the temperature of the exhaust gas flowing through the exhaust passage 15. The instructed opening degree decision part 40 decides the greater of the feedforward opening degree FF, which is acquired by the feedforward opening degree acquisition part 38, and the feedback opening degree FB, which is acquired by the feedback opening degree acquisition part 39, as the instructed opening degree I to be instructed for the exhaust throttle valve 22.

During control of reducing the opening degree of the exhaust throttle valve 22, the temperature of the exhaust gas flowing through the exhaust passage 15 may become high more than expected due to the operation failure and the decrease in responsiveness, which are caused by fixation of the exhaust throttle valve 22 due to, for example, non-combusted fuel (HC) and particulate matters (PM) contained in the exhaust gas discharged from the engine body 11 (engine), or disturbance such as abnormal combustion of a residual fuel remaining in the combustion chamber.

Thus, deciding only the feedforward opening degree FF acquired based on the information 7 regarding the operational condition of the engine as the instructed opening degree I of the exhaust throttle valve 22, when the exhaust gas flowing through the exhaust passage 15 has the high temperature exceeding the target temperature TT due to the above-described disturbance, the failure in the engine body 11 and the thermal deterioration of the oxidation catalyst of the DOC 51 may be caused without the high-temperature state being corrected.

The above-described feedback opening degree acquisition part 39 acquires the feedback opening degree FB based on the difference between the preset target temperature TT and the detected temperature DT of the exhaust gas flowing through the exhaust passage 15. Deciding only the feedback opening degree FB as the instructed opening degree I of the exhaust throttle valve 22, control of reducing the difference between the target temperature TT and the detected temperature DT is performed. However, the opening degree of the exhaust throttle valve 22 is decreased too much in order to increase the detected temperature DT, which may result in lack of the amount of the air supplied to the combustion chamber 12 of the engine and the amount of the exhaust gas discharged from the combustion chamber 12.

Figure 12:
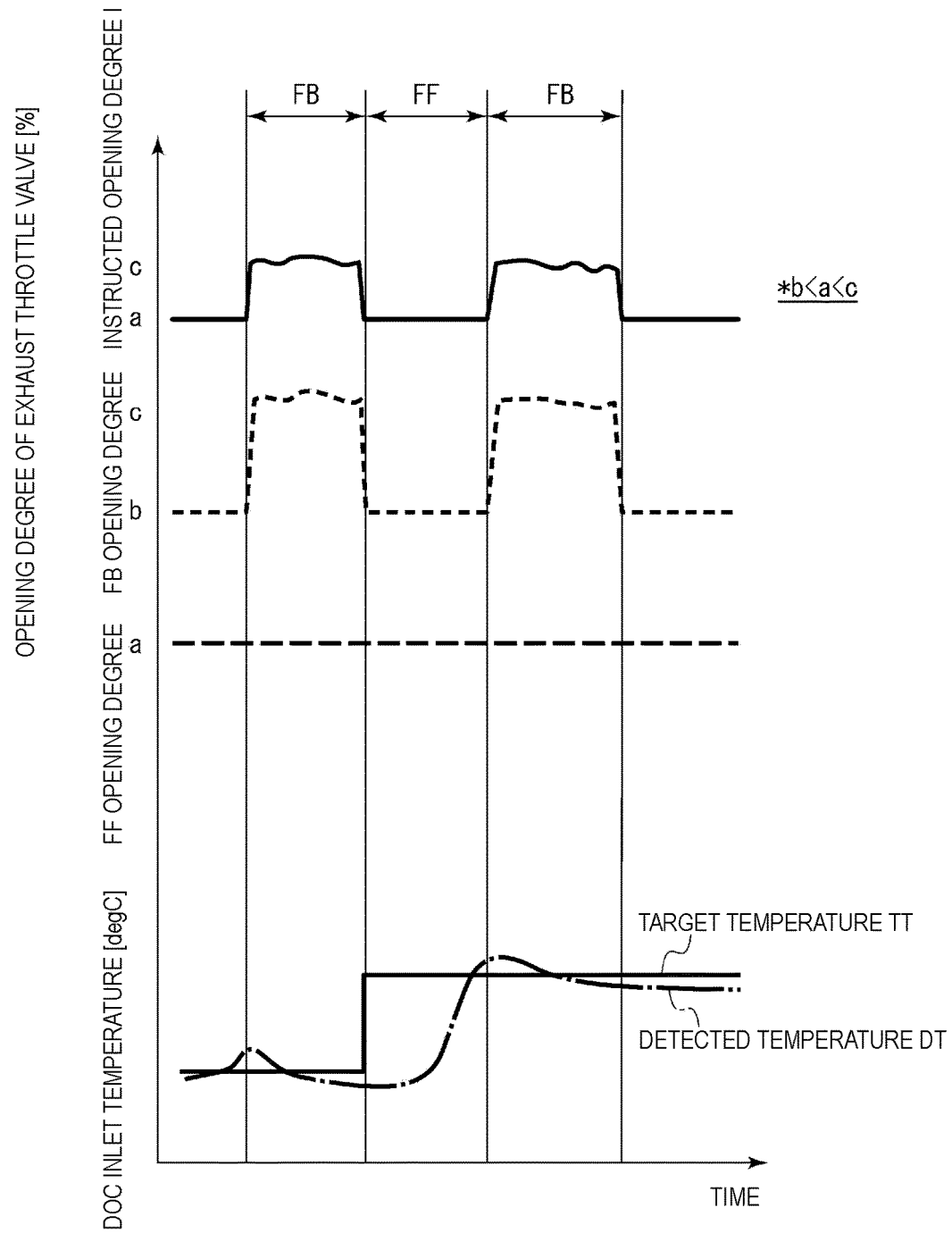
FIG. 12 is a chart for describing the opening degree of the exhaust throttle valve in the second embodiment of the present invention.

With the above configuration, as shown in FIG. 12 to be described later, deciding the greater of the feedforward opening degree FF and the feedback opening degree FB as the instructed opening degree I of the exhaust throttle valve 22, it is possible to prevent the lack of the amount of the air supplied to the combustion chamber 12 of the engine and the amount of the exhaust gas discharged from the combustion chamber 12, and to suppress the high temperature of the exhaust gas flowing through the exhaust passage 15 exceeding the target temperature TT. Thus, with the above configuration, it is possible to prevent the abnormal increases in temperature and pressure of the exhaust gas in the exhaust passage 15 of the engine, and to prevent the failure in the engine body 11 and the thermal deterioration of the oxidation catalyst of the DOC 51, during control of reducing the opening degree of the exhaust throttle valve 22.

Figure 10:
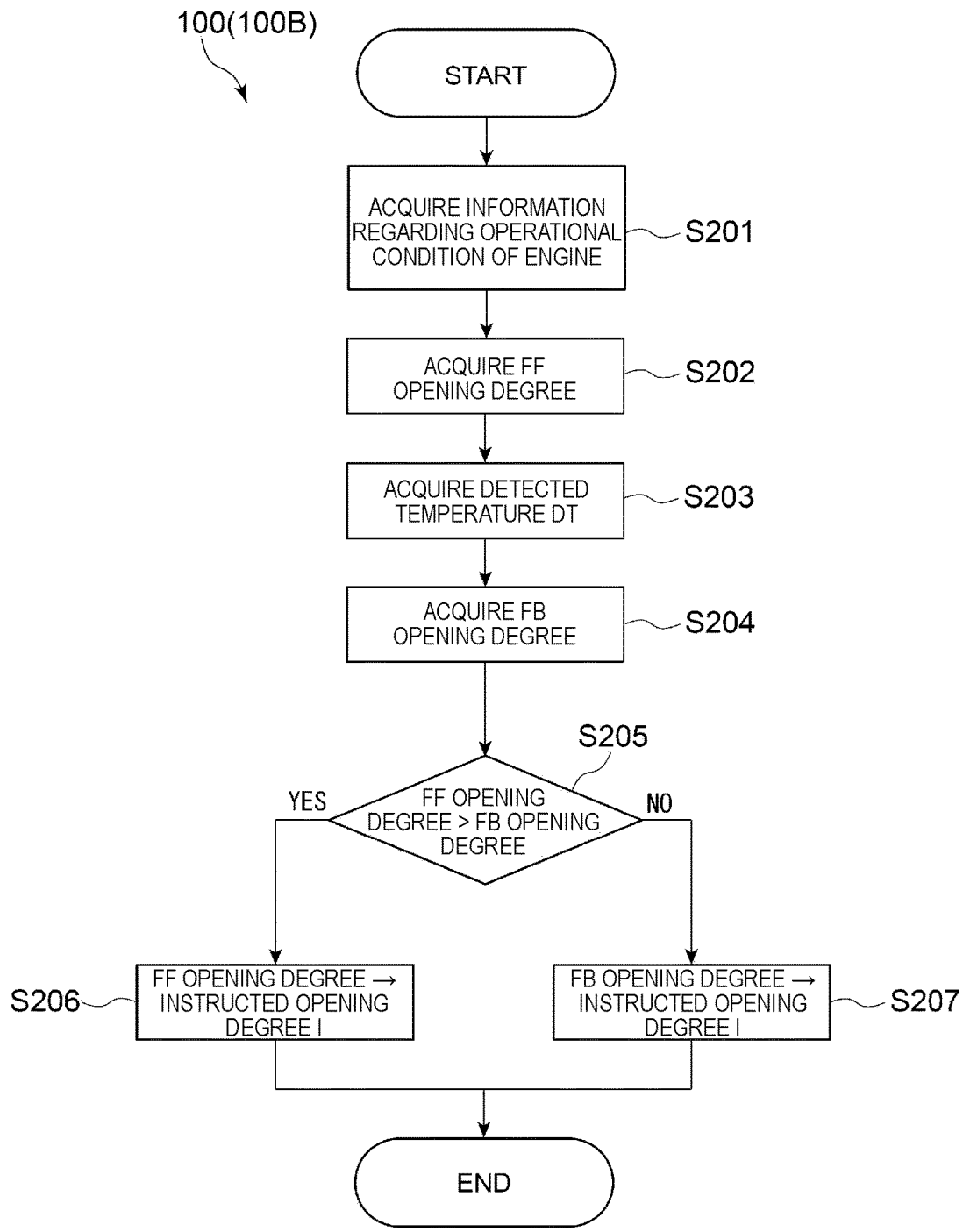
FIG. 10 is a flowchart showing an example of the engine control method according to the second embodiment of the present invention.
Figure 11:
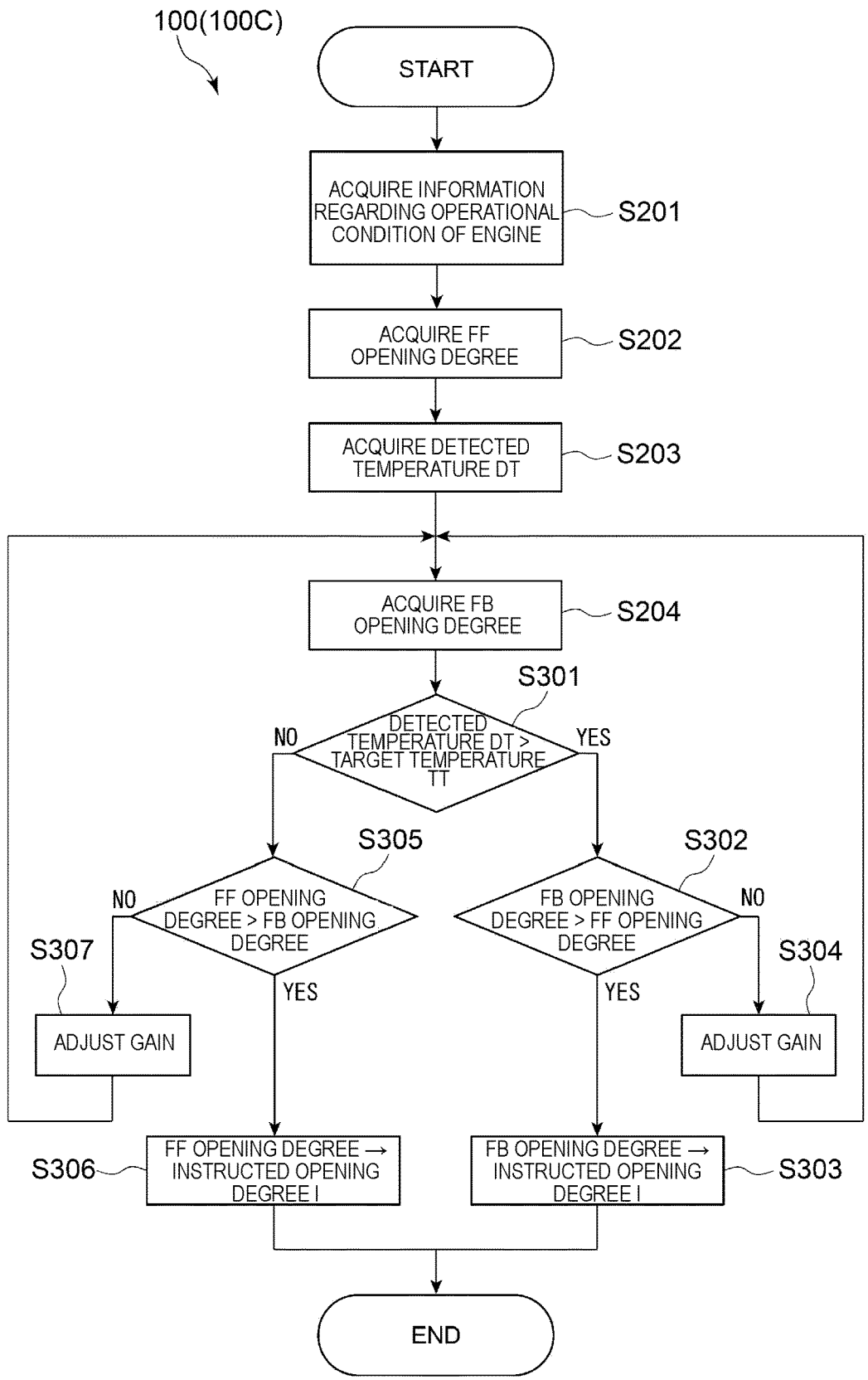
FIG. 11 is a flowchart showing another example of the engine control method according to the second embodiment of the present invention.

FIG. 10 is a flowchart showing an example of the engine control method according to the second embodiment of the present invention. FIG. 11 is a flowchart showing another example of the engine control method according to the second embodiment of the present invention. FIG. 12 is a chart for describing the opening degree of the exhaust throttle valve in the second embodiment of the present invention.

The engine control method 100 (100B, 100C) and the configuration of the above-described control device 3 according to some embodiments will be described below with reference to FIGS. 10 to 12. The engine control method 100 (100B, 100C) is a method for controlling the above-described engine 1 for executing the above-described forced regeneration process FRP. The engine control method 100 (100B, 100C) is also applicable to, for example, a warming-up operation other than the above-described forced regeneration process FRP.

In some embodiments, as shown in FIG. 10, 11, the engine control method 100 (100B, 100C) includes a feedforward opening degree acquisition step S202, a feedback opening degree acquisition step S204, and an instructed opening degree decision step. The feedforward opening degree acquisition step S202 includes acquiring the feedforward opening degree FF, which is the opening degree of the exhaust throttle valve 22, based on the information 7 regarding the operational condition of the engine. The feedback opening degree acquisition step S204 includes acquiring the feedback opening degree FB, which is the opening degree of the exhaust throttle valve 22, based on the difference between the target temperature TT and the detected temperature DT. The instructed opening degree decision step includes deciding the greater of the feedforward opening degree FF, which is acquired in the feedforward opening degree acquisition step S202, and the feedback opening degree FB, which is acquired in the feedback opening degree acquisition step S204, as the instructed opening degree I to be instructed for the exhaust throttle valve 22. In the illustrated embodiment, as shown in FIG. 10, 11, the engine control method 100 (100B, 100C) further includes, before the feedforward opening degree acquisition step S202, step S201 of acquiring the information 7 regarding the operational condition of the engine and step S203 of acquiring the detected temperature DT by the exhaust gas temperature detection device 8 capable of detecting the temperature of the exhaust gas flowing through the exhaust passage 15.

In the embodiment shown in FIG. 10, the above-described instructed opening degree decision step includes steps S205 to S207. In step S205, it is determined whether the feedforward opening degree FF is greater than the feedback opening degree FB. If the feedforward opening degree FF is greater than the feedback opening degree FB ("Yes" in S205), the feedforward opening degree FF is decided as the instructed opening degree I (S206). If the feedforward opening degree FF is not greater than the feedback opening degree FB ("No" in S205), the feedback opening degree FB is decided as the instructed opening degree I (S207).

In the embodiment shown in FIG. 11, the above-described instructed opening degree decision step includes steps S302, S303, S305, S306.

With the above method, as shown in FIG. 12, since the engine control method 100 (100B, 100C) decides the greater of the feedforward opening degree FF, which is acquired based on the information 7 regarding the operational condition of the engine, and the feedback opening degree FB, which is acquired based on the difference between the preset target temperature TT and the detected temperature DT of the exhaust gas flowing through the exhaust passage 15, as the instructed opening degree I of the exhaust throttle valve 22, it is possible to prevent the lack of the amount of the air supplied to the combustion chamber 12 of the engine and the amount of the exhaust gas discharged from the combustion chamber 12, and to suppress the high temperature of the exhaust gas flowing through the exhaust passage 15 exceeding the target temperature TT. Thus, with the above method, it is possible to prevent the abnormal increases in temperature and pressure of the exhaust gas in the exhaust passage 15 of the engine, and to prevent the failure in the engine body 11 and the thermal deterioration of the oxidation catalyst of the DOC 51, during control of reducing the opening degree of the exhaust throttle valve 22.

In the engine control method 100 (100C), after feedforward opening degree acquisition step S202 and the feedback opening degree acquisition step S204, it is determined whether the detected temperature DT is higher than the target temperature TT (S301).

If the detected temperature DT is higher than the target temperature TT ("Yes" in S301), it is determined whether the feedback opening degree FB is greater than the feedforward opening degree FF (S302). If the feedback opening degree FB is greater than the feedforward opening degree FF ("Yes" in S302), the feedback opening degree FB is decided as the instructed opening degree I (S303).

If the feedback opening degree FB is not greater than the feedforward opening degree FF ("No" in S302), the feedback opening degree acquisition step S204 is performed again after adjustment of the control gain (S304). In S304, the control gain is adjusted such that the feedback opening degree FB recalculated in the subsequent feedback opening degree acquisition step S204 is greater than the feedforward opening degree FF. Thus, the recalculated feedback opening degree FB is decided as the instructed opening degree I (S303).

On the other hand, if the detected temperature DT is not higher than the target temperature TT ("No" in S301), it is determined whether the feedforward opening degree FF is greater than the feedback opening degree FB (S305). If the feedforward opening degree FF is greater than the feedback opening degree FB ("Yes" in S305), the feedforward opening degree FF is decided as the instructed opening degree I (S306).

If the feedforward opening degree FF is not greater than the feedback opening degree FB ("No" in S305), the feedback opening degree acquisition step S204 is performed again after adjustment of the control gain (S307). In S307, the control gain is adjusted such that the feedback opening degree FB recalculated in the subsequent feedback opening degree acquisition step S204 is less than the feedforward opening degree FF. Thus, the feedforward opening degree FF which is less than the recalculated feedback opening degree FB is decided as the instructed opening degree I (S306).

As shown in FIG. 8, the above-described control device 3 further includes a control gain adjustment part 41 configured to be able to adjust the control gain when the feedback opening degree FB is calculated. In the illustrated embodiment, the above-described steps S304, S307 are performed by the control gain adjustment part 41. Moreover, the above-described steps S301 to S303, S305, S306 are performed by the instructed opening degree decision part 40.

In some embodiments, the above-described control device 3 includes the above-described control gain adjustment part 41 configured to be able to adjust the control gain when the feedback opening degree FB is calculated. Then, the above-described control gain adjustment part 41 is configured to adjust the control gain such that the recalculated feedback opening degree FB is greater than the feedforward opening degree FF, if the detected temperature DT exceeds the target temperature TT, and the feedback opening degree FB is not greater than the feedforward opening degree FF.

With the above configuration, if the detected temperature DT exceeds the target temperature TT, the feedback opening degree FB is decided as the instructed opening degree I of the exhaust throttle valve 22. At this time, if the feedback opening degree FB is not greater than the feedforward opening degree FF, the control gain adjustment part 41 adjusts the control gain such that the recalculated feedback opening degree FB is greater than the feedforward opening degree FF. With the above configuration, if the detected temperature DT exceeds the target temperature TT, the opening degree is controlled with the above-described recalculated feedback opening degree FB being decided as the instructed opening degree I of the exhaust throttle valve 22. Thus, control of increasing the opening degree of the exhaust throttle valve 22, and decreasing the temperature and pressure of the exhaust gas flowing through the exhaust passage 15 is performed quickly such that the detected temperature DT approaches the target temperature TT, making it possible to shorten a period in which the exhaust gas flowing through the exhaust passage 15 has the high temperature exceeding the target temperature TT.

In some embodiments, the above-described control device 3 includes the above-described control gain adjustment part 41 configured to be able to adjust the control gain when the feedback opening degree FB is calculated. Then, the above-described control gain adjustment part 41 is configured to adjust the control gain such that the recalculated feedback opening degree FB is less than the feedforward opening degree FF, if the detected temperature DT is not higher than the target temperature TT, and the feedforward opening degree FF is not greater than the feedback opening degree FB.

With the above configuration, if the detected temperature DT is not higher than the target temperature TT, the feedforward opening degree FF is decided as the instructed opening degree I of the exhaust throttle valve 22. At this time, if the feedforward opening degree FF is not greater than the feedback opening degree FB, the control gain adjustment part 41 adjusts the control gain such that the recalculated feedback opening degree FB is less than the feedforward opening degree FF. With the above configuration, if the detected temperature DT is not higher than the target temperature TT, the opening degree is controlled with the feedforward opening degree FF being decided as the instructed opening degree I of the exhaust throttle valve 22. Thus, since the opening degree of the exhaust throttle valve 22 is controlled based on the information 7 regarding the operational condition of the engine, it is possible to prevent the lack of the amount of the air supplied to the combustion chamber 12 of the engine and the amount of the exhaust gas discharged from the combustion chamber 12.

In some embodiments, as shown in FIG. 9, the information 7 regarding the operational condition of the engine described above includes the engine rotation speed and the fuel injection amount. In this case, since the information 7 regarding the operational condition of the engine includes the engine rotation speed and the fuel injection amount, the feedforward opening degree acquisition part 38 can acquire the appropriate feedforward opening degree FF on which the engine rotation speed and the fuel injection amount are reflected.

In some embodiments described above, the exhaust gas purification system 10 includes the above-described control device 3, the above-described DOC 51, the above-described DPF 52, and the above-described temperature increase unit 6 including the above-described exhaust throttle valve 22. In this case, since the control device 3 causes the exhaust throttle valve 22 to execute the valve opening/closing operation VO when the forced regeneration process FRP is switched from the first temperature increase process FHP to the second temperature increase process SHP, the exhaust gas purification system 10 can prevent the operation failure caused by fixation of the exhaust throttle valve 22 during the second temperature increase process SHP.

The present invention is not limited to the above-described embodiments, and also includes an embodiment obtained by modifying the above-described embodiments and an embodiment obtained by combining these embodiments as appropriate.

REFERENCE SIGNS LIST

1 Engine
10 Exhaust gas purification system
11 Engine body
12 Combustion chamber
13 Fuel injection valve
14 Intake passage
15 Exhaust passage
16 Exhaust passage injection valve
17 Turbocharger
18 EGR device 2 Throttle valve
21 Intake throttle valve
22 Exhaust throttle valve
3 Control device
31 Input/output part
32 Storage part
33 Injection control part
34 Throttle valve opening degree instruction part
35 Forced regeneration process execution condition determination part
36 Forced regeneration process execution part
36A First temperature increase process execution part
36B Second temperature increase process execution part
37 Valve opening/closing operation execution part
38 Feedforward opening degree acquisition part
39 Feedback opening degree acquisition part
40 Instructed opening degree decision part
41 Control gain adjustment part
5 Exhaust gas purification device
51 DOC
52 DPF
6 Temperature increase unit
7 Information regarding operational condition of engine
8 Exhaust gas temperature detection device
100, 100A to 100C Engine control method
DT Detected temperature
FB Feedback opening degree
FF Feedforward opening degree
FHP First temperature increase process
FRP Forced regeneration process
H Second instructed opening degree
I Instructed opening degree
SHP Second temperature increase process
T Predetermined time
T1 First temperature
T2 Second temperature
TT Target temperature
VO Valve opening/closing operation

The invention claimed is:

1. A control device configured to be able to execute, in an engine which includes a diesel oxidation catalyst (DOC) disposed in an exhaust passage of the engine, a diesel particulate filter (DPF) disposed downstream of the DOC in the exhaust passage, and a temperature increase unit for increasing a temperature of each of the DOC and the DPF, a forced regeneration process of removing particulate matter (PM) deposited on the DPF by increasing the temperature of the DPF,
wherein the forced regeneration process includes a first temperature increase process of controlling the temperature increase unit such that the temperature of the DOC is increased to a first temperature, and a second temperature increase process of controlling the temperature increase unit such that the temperature of the DPF is increased to a second temperature which is higher than the first temperature after completion of the first temperature increase process,
wherein the temperature increase unit includes an exhaust throttle valve disposed in the exhaust passage,
wherein the control device comprises:
a processor that performs the operations of:
a valve opening/closing operation execution part configured to cause the exhaust throttle valve to execute a valve opening/closing operation of increasing an opening degree of the exhaust throttle valve to be greater than a predetermined opening degree for a predetermined time, when the forced regeneration process is switched from the first temperature increase process to the second temperature increase process, and
wherein the predetermined time is not greater than one second.

2. The control device according to claim 1,
wherein the valve opening/closing operation execution part is configured to instruct the exhaust throttle valve such that at least one of a speed at which the exhaust throttle valve is opened or a speed at which the exhaust throttle valve is closed in execution of the valve opening/closing operation is not greater than a predetermined speed.

3. The control device according to claim 1,
wherein the valve opening/closing, operation execution part is configured to instruct the exhaust throttle valve on the opening degree, which is less than a fully open opening degree, as the opening degree of the exhaust throttle valve in execution of the valve opening/closing operation.

4. The control device according to claim 1,
wherein the valve opening/closing operation execution part is configured to cause the exhaust throttle valve to execute the valve opening/closing operation before a late-post injection in the second temperature increase process.

5. The control device according to claim 1, further comprising:
a feedforward opening degree acquisition part configured to be able to acquire a feedforward opening degree, which is the opening degree of the exhaust throttle valve, based on information regarding an operational condition of the engine;
a feedback opening degree acquisition part configured to be able to acquire a feedback opening degree, which is the opening degree of the exhaust throttle valve, based on a difference between a preset target temperature and a detected temperature acquired by an exhaust gas temperature detection device capable of detecting a temperature of an exhaust gas flowing through the exhaust passage; and
an instructed opening degree decision part configured to decide greater of the feedforward opening degree, which is acquired by the feedforward opening degree acquisition part, and the feedback opening degree, which is acquired by the feedback opening degree acquisition part, as an instructed opening degree to be instructed for the exhaust throttle valve.

6. The control device according to claim 5, further comprising a control gain adjustment part configured to be able to adjust a control gain when the feedback opening degree is calculated,
wherein the control gain adjustment part is configured to adjust the control gain such that a recalculated feedback opening degree is greater than the feedforward opening degree, if the detected temperature exceeds the target temperature, and the feedback opening degree is not greater than the feedforward opening degree.

7. The control device according to claim 5, further comprising a control gain adjustment part configured to be able to adjust a control gain when the feedback opening degree is calculated,
wherein the control gain adjustment part is configured to adjust the control gain such that a recalculated feedback opening degree is less than the feedforward opening degree, if the detected temperature is not higher than the target temperature, and the feedforward opening degree is not greater than the feedback opening degree.

8. The control device according to claim 5,
wherein the information regarding the operational condition of the engine includes a rotation speed of the engine and a fuel injection amount.

9. An exhaust gas purification system comprising:
the control device according to claim 1;
the DOC;
the DPF; and
the temperature increase unit including the exhaust throttle valve.

10. A control method of an engine, which includes a diesel oxidation catalyst (DOC) disposed in an exhaust passage of the engine, a diesel particulate filter (DPF) disposed downstream of the DOC in the exhaust passage, and a temperature increase unit for increasing a temperature of each of the DOC and the DPF, for executing a forced regeneration process of removing particular matter (PM) deposited on the DPF by increasing the temperature of the DPF,
  wherein the forced regeneration process includes a first temperature increase process of controlling the temperature increase unit such that the temperature of the DOC is increased to a first temperature, and a second temperature increase process of controlling the temperature increase unit such that the temperature of the DPF is increased to a second temperature which is higher than the first temperature after completion of the first temperature increase process,
  wherein the temperature increase unit includes an exhaust throttle valve disposed in the exhaust passage,
  wherein the control method of the engine comprises:
    a step of executing a valve opening/closing operation of increasing an opening degree of the exhaust throttle valve to be greater than a predetermined opening degree for a predetermined time, when the forced regeneration process is switched from the first temperature increase process to the second temperature increase process, and
  wherein the predetermined time is not greater than one second.

11. The control method of the engine according to claim 10, further comprising:
  a feedforward opening degree acquisition step of acquiring a feedforward opening degree, which is the opening degree of the exhaust throttle valve, based on information regarding an operational condition of the engine;
  a feedback opening degree acquisition step of acquiring a feedback opening degree, which is the opening degree of the exhaust throttle valve, based on a difference between a preset target temperature and a detected temperature acquired by an exhaust gas temperature detection device capable of detecting a temperature of an exhaust gas flowing through the exhaust passage; and
  an instructed opening degree decision step of deciding greater of the feedforward opening degree, which is acquired in the feedforward opening degree acquisition step, and the feedback opening degree, which is acquired in the feedback opening degree acquisition step, as an instructed opening degree to be instructed for the exhaust throttle valve.

* * * * *